US010448798B2

United States Patent
Hu et al.

(10) Patent No.: US 10,448,798 B2
(45) Date of Patent: Oct. 22, 2019

(54) FLOOR BRUSH ASSEMBLY FOR UPRIGHT VACUUM CLEANER AND UPRIGHT VACUUM CLEANER WITH THE SAME

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 0 days.

(21) Appl. No.: 15/539,156

(22) PCT Filed: Mar. 4, 2016

(86) PCT No.: PCT/CN2016/075611
§ 371 (c)(1),
(2) Date: Jun. 23, 2017

(87) PCT Pub. No.: WO2017/096722
PCT Pub. Date: Jun. 15, 2017

(65) Prior Publication Data
US 2018/0271341 A1    Sep. 27, 2018

(30) Foreign Application Priority Data

Dec. 10, 2015  (CN) ............................ 2015 1 0917466
Dec. 10, 2015  (CN) ............................ 2015 1 0917497
(Continued)

(51) Int. Cl.
*A47L 9/04*  (2006.01)
*A47L 9/24*  (2006.01)
(Continued)

(52) U.S. Cl.
CPC .............. *A47L 9/0411* (2013.01); *A47L 5/22* (2013.01); *A47L 5/28* (2013.01); *A47L 5/30* (2013.01);
(Continued)

(58) Field of Classification Search
CPC ..... A47L 5/22; A47L 5/28; A47L 5/30; A47L 9/00; A47L 9/04; A47L 9/0411;
(Continued)

(56) References Cited

U.S. PATENT DOCUMENTS 1,858,370 A  *  5/1932  Lucke ....................... A47L 5/34
15/386
2,691,791 A    10/1954  Humphrey
(Continued)

FOREIGN PATENT DOCUMENTS

CN    1667197 A    9/2005
CN    2845692 Y   12/2006
(Continued)

OTHER PUBLICATIONS

CN-203841620-U—English Machine Translation (Year: 2014).*
(Continued)

*Primary Examiner* — Marc Carlson
(74) *Attorney, Agent, or Firm* — Kilpatrick Townsend & Stockton LLP

(57) ABSTRACT

A floor brush assembly for an upright vacuum cleaner (1) and an upright vacuum cleaner (1) with the same are disclosed. The floor brush includes a brushroll (11); a motor (22) driving the brushroll (11) to roll via a drive belt (13) that is winded upon a motor shaft (221) of the motor (22) and a central part of the brushroll (11); and a brushroll casing (12) provided outside the brushroll (11), having a dust suction port and defining a brushroll air-suction channel (122) and a drive-belt mounting chamber (123) for mounting the drive
(Continued)

belt, in which the brushroll air-suction channel (122) comprises a first air-suction channel (1221) and a second air-suction channel (1222) located at both sides of the drive-belt mounting chamber (123).

20 Claims, 6 Drawing Sheets

(30) Foreign Application Priority Data

| Dec. 10, 2015 | (CN) | 2015 1 0917498 |
|---|---|---|
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.

| *A47L 9/16* | (2006.01) |
|---|---|
| *A47L 5/22* | (2006.01) |
| *A47L 9/00* | (2006.01) |
| *A47L 9/28* | (2006.01) |
| *A47L 5/30* | (2006.01) |
| *F16H 7/08* | (2006.01) |
| *A47L 9/10* | (2006.01) |
| *A47L 9/14* | (2006.01) |
| *A47L 5/28* | (2006.01) |
| *A47L 5/32* | (2006.01) |
| *A47L 9/32* | (2006.01) |
| *A47L 5/34* | (2006.01) |
| *F16D 23/12* | (2006.01) |

(52) U.S. Cl.
CPC ............... *A47L 5/32* (2013.01); *A47L 5/34* (2013.01); *A47L 9/00* (2013.01); *A47L 9/04* (2013.01); *A47L 9/0444* (2013.01); *A47L 9/0477* (2013.01); *A47L 9/102* (2013.01); *A47L 9/1409* (2013.01); *A47L 9/16* (2013.01); *A47L 9/1683* (2013.01); *A47L 9/248* (2013.01); *A47L 9/28* (2013.01); *A47L 9/2852* (2013.01); *A47L 9/2857* (2013.01); *A47L 9/2863* (2013.01); *A47L 9/325* (2013.01); *F16H 7/0827* (2013.01); *F16D 2023/126* (2013.01)

(58) Field of Classification Search
CPC ...... A47L 9/0444; A47L 9/0477; A47L 9/102; A47L 9/1409; A47L 9/16; A47L 9/1683; A47L 9/248; A47L 9/28; A47L 9/2852; A47L 9/2857; F16D 2023/126; F16H 7/0827

See application file for complete search history.

(56) References Cited

U.S. PATENT DOCUMENTS

| 3,273,195 | A | | 9/1966 | Jepson et al. | |
|---|---|---|---|---|---|
| 3,646,632 | A | | 3/1972 | MacFarland | |
| 3,716,889 | A | | 2/1973 | Goldstein | |
| 3,790,987 | A | * | 2/1974 | MacFarland | A47L 5/30 15/328 |
| 4,850,077 | A | * | 7/1989 | Venturini | A47L 5/30 15/384 |
| 10,130,230 | B2 | * | 11/2018 | Moser | A47L 5/30 |
| 2002/0129462 | A1 | * | 9/2002 | Matusz | A47L 5/30 15/384 |
| 2008/0086833 | A1 | * | 4/2008 | Capron-Tee | A47L 5/30 15/331 |
| 2010/0107356 | A1 | * | 5/2010 | Jakubos | A47L 9/0433 15/383 |
| 2010/0257693 | A1 | | 10/2010 | Sweeby et al. | |
| 2013/0091663 | A1 | * | 4/2013 | Mersmann | A47L 9/0411 15/389 |
| 2014/0157541 | A1 | * | 6/2014 | Morphey | A47L 5/28 15/347 |

FOREIGN PATENT DOCUMENTS

| CN | 101201123 | A | * | 6/2008 |
|---|---|---|---|---|
| CN | 101201123 | A | | 6/2008 |
| CN | 202235160 | U | | 5/2012 |
| CN | 102499608 | A | | 6/2012 |
| CN | 103829882 | A | | 6/2014 |
| CN | 203841620 | U | * | 9/2014 |
| CN | 204520516 | U | | 8/2015 |
| CN | 205251420 | U | | 5/2016 |
| CN | 205338839 | U | | 6/2016 |
| EP | 0520175 | A1 | | 12/1992 |
| GB | 141843 | A | | 4/1920 |
| GB | 2486666 | A | | 6/2012 |

OTHER PUBLICATIONS

CN-101201123-A—English Machine Translation (Year: 2008).*
EP office action dated Feb. 8, 2018 in the corresponding EP application (application No. 16871930.0).
CN Office action dated May 26, 2017 in the corresponding CN application (application No. 201510917499.7).
CN Office action dated Jun. 1, 2017 in the corresponding CN application (application No. 201510917528.X).
CN Office action dated Jun. 1, 2017 in the corresponding CN application (application No. 201510918580.7).

* cited by examiner

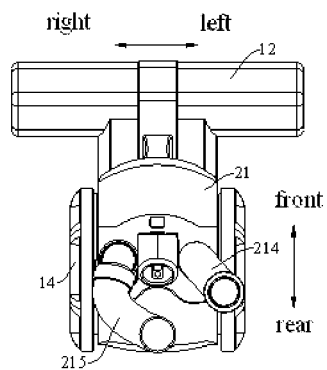
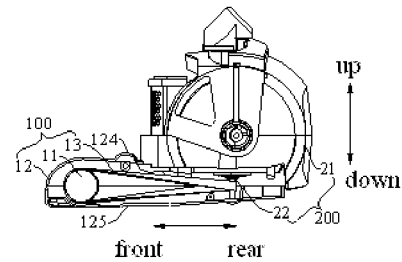
Fig. 9                    Fig. 10
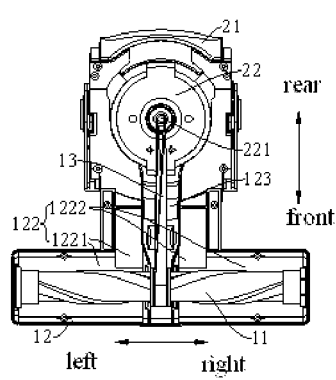
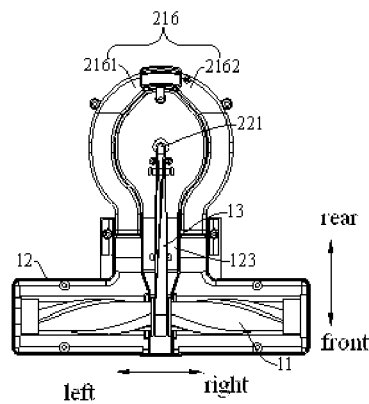
Fig. 11                    Fig. 12
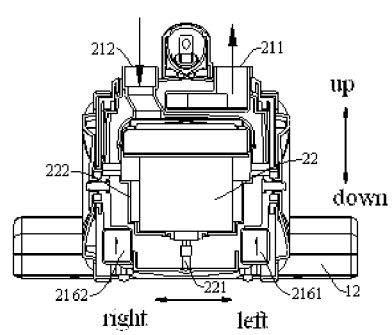
Fig. 13

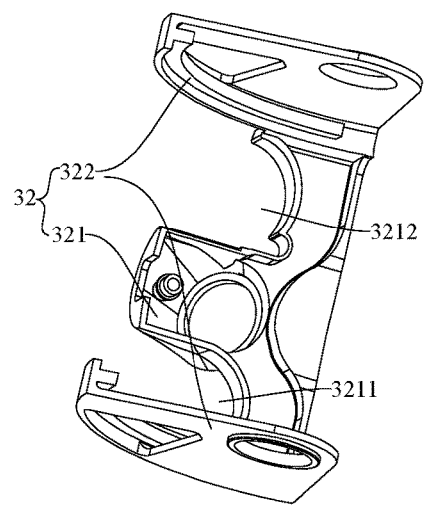
Fig. 20
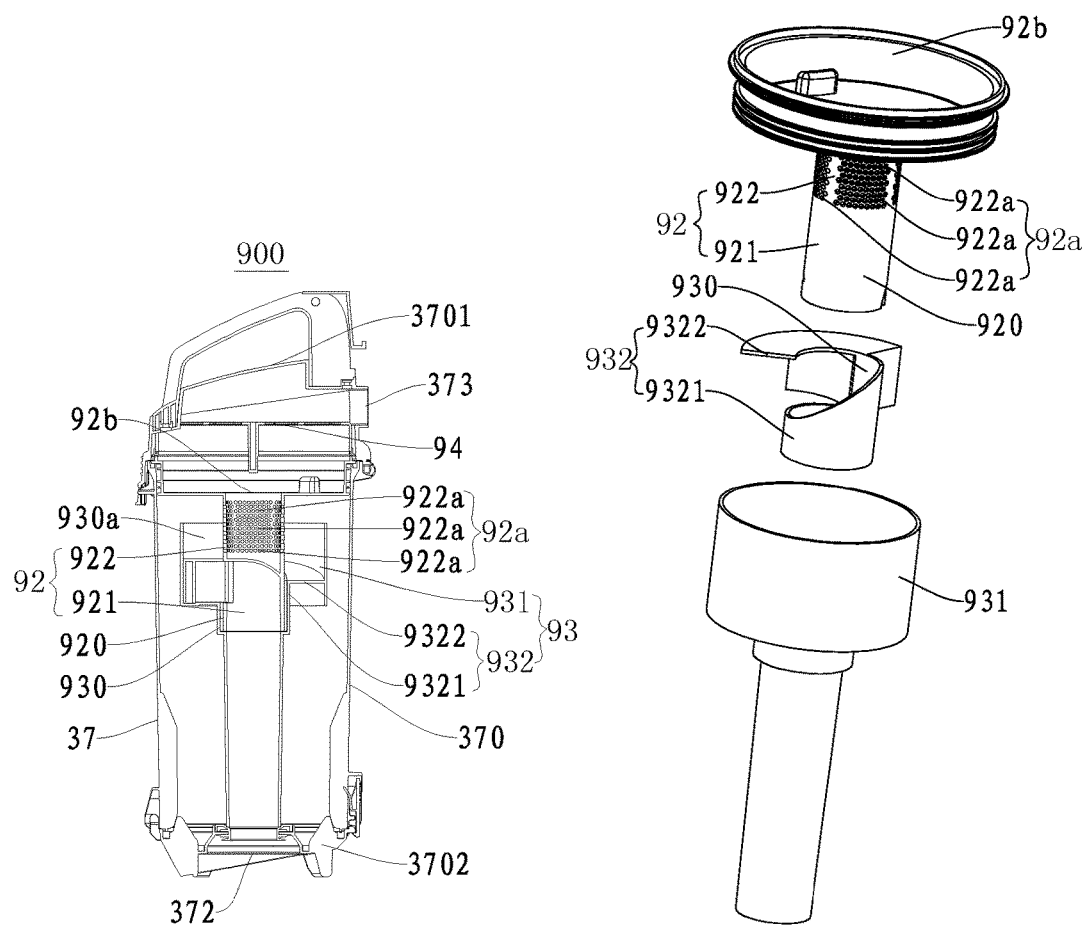
Fig. 21
Fig. 22

FLOOR BRUSH ASSEMBLY FOR UPRIGHT VACUUM CLEANER AND UPRIGHT VACUUM CLEANER WITH THE SAME

CROSS REFERENCE TO RELATED APPLICATION

The present application is a National Stage of International Application No. PCT/CN2016/075611, filed Mar. 4, 2016, which claims the priority and benefit of Chinese Patent Application No. 201510917499.7, 201521029002.X, 201510917466.2, 201521028726.2, 201510917497.8, 201521028730.9, 201521029087.1, 201510918662.1, 201521028812.3, 201510918544.0, 201521028739.X, 201510918580.7, 201521027156.5, 201510917498.2, 201521027158.4, 201521028814.2, 201521028779.4, 201521029798.9, 201510918541.7, 201521027550.9, 201510917653.0, 201521028784.5, 201510917528.X, 201521028913.0, and 201521030034.1, all filed on Dec. 10, 2015, and 201610114861.1 and 201620155481.8, both filed on Mar. 1, 2016, the contents of which are incorporated herein by reference in their entirety.

FIELD

The present disclosure relates to a field of cleaning machines, and more particularly to a floor brush assembly for an upright vacuum cleaner and an upright vacuum cleaner with the same.

BACKGROUND

A vacuum cleaner in the related art includes two motors to drive a brushroll and a fan respectively, and the motor for driving the fan is usually disposed horizontally. That is, a motor shaft of the motor is parallel to a mounting platform of the motor, such that a motor housing may have a huge volume and the motor may occupy a large area. Moreover, the motor disposed horizontally limits the arrangement of other parts of the vacuum cleaner to a great extent.

SUMMARY

The present disclosure aims to solve at least one of the technical problems existing in the related art. Thus, embodiments of the present disclosure provide an upright vacuum cleaner, and a floor brush assembly of the upright vacuum cleaner has a simple and compact structure that occupies small space and is easy to assemble or disassemble, which may facilitate diverse arrangements of various parts.

Embodiments of the present disclosure further provide an upright vacuum cleaner with the above floor brush assembly. The upright vacuum cleaner has a simple and compact structure that occupies small space and is easy to operate in a stable and reliable manner.

According to embodiments of a first aspect of the present disclosure, the floor brush assembly for the upright vacuum cleaner includes a brushroll; a motor driving the brushroll to roll via a drive belt that is winded upon a motor shaft of the motor and a central part of the brushroll; and a brushroll casing provided outside the brushroll, having a dust suction port and defining a brushroll air-suction channel and a drive-belt mounting chamber for mounting the drive belt, in which the brushroll air-suction channel includes a first air-suction channel and a second air-suction channel located at both sides of the drive-belt mounting chamber.

In the floor brush assembly for the upright vacuum cleaner according to embodiments of the present disclosure, it is possible to achieve the effect of dust suction at both sides of the drive belt by disposing the first air-suction channel and the second air-suction channel at both sides of the drive belt, so as to expand the range of dust suction and improve the working efficiency of the upright vacuum cleaner. Moreover, the upright vacuum cleaner controls the rotation of the brushroll and generation of a dust suction flow simultaneously by one motor, which occupies smaller space with fewer parts and realizes synchronous control over dust sweep and dust suction. Additionally, the motor of the upright vacuum cleaner is disposed vertically to reduce the occupation space of the upright vacuum cleaner and facilitate diverse arrangements of various parts of the upright vacuum cleaner.

According to an example of the present disclosure, a rotating axis of the motor is provided in perpendicular to a rotating axis of the brushroll, and the drive belt is provided at a twist angle of 90°.

According to an example of the present disclosure, the rotating axis of the motor is disposed vertically; the floor brush assembly further includes a stopping piece provided below the drive belt and adjacent to the motor to prevent the drive belt from slipping off from the motor shaft.

According to an example of the present disclosure, the first air-suction channel and the second air-suction channel are arranged symmetrically with respect to the drive belt.

According to an example of the present disclosure, the brushroll includes a first brushroll section provided with bristles, a second brushroll section provided with bristles, and a connecting-shaft section connected between the first brushroll section and the second brushroll section, in which the drive belt is winded upon the motor shaft and the connecting-shaft section to make the motor to drive the brushroll to roll.

According to an example of the present disclosure, the brushroll further includes: a first baffle provided between the connecting-shaft section and the first brushroll section to separate the connecting-shaft section and the first brushroll section; and a second baffle provided between the connecting-shaft section and the second brushroll section to separate the connecting-shaft section and the second brushroll section.

According to an example of the present disclosure, the first brushroll section includes a first body and a first bristle provided on the first body; the second brushroll section includes a second body and a second bristle provided on the second body; there is a plurality of first bristles and each first bristle is spirally winded about the first body in a first direction; there is a plurality of second bristles and each second bristle is spirally winded about the second body in a second direction, the first direction being opposite to the second direction.

According to an example of the present disclosure, the first brushroll section and the second brushroll section are provided symmetrically relative to the drive belt; the respective central axes of the first brushroll section, the second brushroll section and the connecting-shaft section are located in the same line.

According to an example of the present disclosure, the brushroll casing includes a lower casing and an upper casing connected to a top of the lower casing; the first air-suction channel and the second air-suction channel are defined by the upper casing and/or the lower casing.

According to an example of the present disclosure, the floor brush assembly further includes a tensioning wheel provided opposite to a part of the drive belt adjacent to the brushroll to tension the drive belt.

According to embodiments of a second aspect of the present disclosure, the upright vacuum cleaner includes: the floor brush assembly for the upright vacuum cleaner according to the above embodiments that further includes a motor housing provided outside the motor, having an air exhaust hole, a dirty air outlet and a clean air inlet, and defining a motor air-suction channel and a motor air-exhaust channel, in which the motor air-suction channel is communicated between the brushroll air-suction channel and the dirty air outlet while the motor air-exhaust channel is communicated between the clean air inlet and the air exhaust hole; and a body assembly including a body, and a dirt cup mounted on the body and having a separating chamber communicated with the dirty air outlet and the clean air inlet respectively.

According to an example of the present disclosure, the dirty air outlet is connected to the dirt cup by an air-inlet pipe assembly so as to be communicated with the separating chamber; the air-inlet pipe assembly includes: an air-inlet pipe provided on the motor housing and having a first end connected to the dirty air outlet, and a first hose connected between a second end of the air-inlet pipe and an air inlet of the dirt cup.

According to an example of the present disclosure, the first hose is detachably connected between the second end of the air-inlet pipe and the air inlet of the dirt cup.

According to an example of the present disclosure, the body defines a body air-exhaust channel that has a first end connected to an air outlet of the dirt cup and communicated with the separating chamber, and a second end communicated with the clean air inlet.

According to an example of the present disclosure, the second end of the body air-exhaust channel is communicated with the clean air inlet by an air exhaust pipe.

According to an example of the present disclosure, the motor air-suction channel includes a first branch channel communicated to the first air-suction channel and a second branch channel communicated to the second air-suction channel; the first branch channel and the second branch channel are converged and communicated with the dirty air outlet.

According to an example of the present disclosure, the first branch channel and the second branch channel are defined by the motor casing of the motor and the motor housing together, and constitute a stereoscopic space with a substantially annular cross section.

According to an example of the present disclosure, the dirty air outlet and the clean air inlet are arranged axially symmetrically with respect to a central line of the motor housing.

According to an example of the present disclosure, the upright vacuum cleaner further includes a directional control valve having a first air hole, a second air hole and a third air hole, in which the first air hole is communicated with the brushroll air-suction channel, the second air hole with the air inlet of the dirt cup, the third air hole with the outside, and the directional control valve is configured to switch between a first state where the first air hole and the second air hole are communicated and a second state where the second air hole and the third air hole are communicated.

According to an example of the present disclosure, the directional control valve includes: a three-way pipe including a first pipe section, a second pipe section and a third pipe section communicated with one another, the first air hole defined by a free end of the first pipe section and the second air hole defined by a free end of the second pipe section; and a two-way pipe including a fourth pipe section and a fifth pipe section communicated with each other, the third air hole defined by a free end of the fourth pipe section and a fourth air hole defined by the fifth pipe section, in which at least a part of the fifth pipe section is inserted into the third pipe section and is movable between a first position where the first air hole is communicated with the second air hole and a second position where the fourth air hole is communicated with the second air hole; a first end of the fifth pipe section is connected with the fourth pipe section and a second end of the fifth pipe section has a closed end wall, and the fourth air hole is formed in a side wall of the second end of the fifth pipe section; an end of the fourth pipe section connected with the fifth pipe section abuts against a free end of the third pipe section when the two-way pipe moves to the second position.

According to an example of the present disclosure, the upright vacuum cleaner further includes a second hose having a first end communicated with the outside and a second end connected with the third air hole.

According to an example of the present disclosure, the dirt cup includes the air inlet and the air outlet; and the body assembly further includes: a filter provided in the dirt cup and having a filter inlet and a filter outlet communicated between the filter inlet and the air outlet; and a cyclonic cone assembly having a cyclone and a cyclonic guide, in which a first end of the cyclone is communicated with the air inlet, and the cyclonic guide is fitted in a second end of the cyclone and is detachably fitted over the filter to spirally guide dirty air introduced into the cyclone from the air inlet to the filter inlet.

According to an example of the present disclosure, the cyclonic guide includes a first cylindrical surface and the filter includes a second cylindrical surface, the cyclonic guide being detachably fitted over the filter by the first cylindrical surface and the second cylindrical surface.

According to an example of the present disclosure, the filter is configured as a cylinder with an open end and a closed end; the open end of the filter defines the filter outlet and the filter inlet is formed in a side wall of the filter.

According to an example of the present disclosure, the filter includes a first section and a second section; the first section is configured to be a solid cylinder while the second section is configured to be a hollow cylinder; a first end of the second section is connected with a first end of the first section and a second end of the second section is open to define the filter outlet, and the filter inlet is formed in a side wall of the second section.

According to an example of the present disclosure, the filter inlet includes a plurality of filter pores that are evenly spaced apart and distributed in an axial direction and/or a circumferential direction of the second section.

According to an example of the present disclosure, the cyclonic guide includes: a sleeve having a portion fitted over the first section; and a guide plate provided between the sleeve and the cyclone to define, along with the sleeve and the cyclone, a spiral channel for the dirty air to spirally flow from the air inlet to the filter inlet.

According to an example of the present disclosure, the sleeve and the guide plate are molded integrally.

According to an example of the present disclosure, the cyclone and the cyclonic guide are connected with thread or in a hot-melt manner via ultrasonic waves.

Additional aspects and advantages of embodiments of present disclosure will be given in part in the following descriptions, become apparent in part from the following descriptions, or be learned from the practice of the present disclosure.

BRIEF DESCRIPTION OF THE DRAWINGS

FIG. 9 is a top view of the structure shown in FIG. 8;

FIG. 10 is a side view of the structure shown in FIG. 7;

FIG. 11 is a bottom view of the structure shown in FIG. 7;

FIG. 12 is a schematic view of an internal channel of the structure shown in FIG. 11;

FIG. 13 is a rear view of an internal channel of the structure shown in FIG. 8;

FIG. 20 is a schematic view of a bridging member of an upright vacuum cleaner according to an embodiment of the present disclosure;

FIG. 21 is a schematic view of a cyclonic separating device according to an embodiment of the present disclosure;

FIG. 22 is an explosive view of a partial structure of a cyclonic separating device according to an embodiment of the present disclosure;

Figure 1:
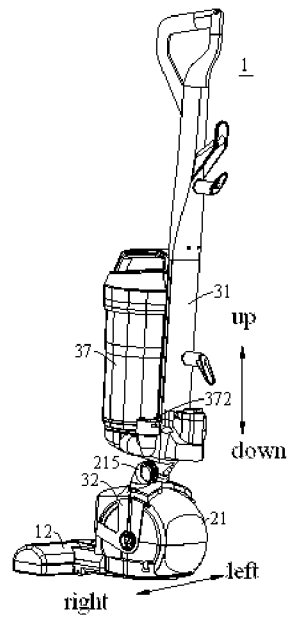
FIG. 1 is a schematic view of an upright vacuum cleaner according to an embodiment of the present disclosure.

REFERENCE NUMERALS 1 upright vacuum cleaner
100 brushroll assembly
11 brushroll
111 first brushroll section
1111 first body
1112 first bristle
112 second brushroll section
1121 second body
1122 second bristle
113 connecting-shaft section
114 first baffle
115 second baffle
12 brushroll casing
122 brushroll air-suction channel
1221 first air-suction channel
1222 second air-suction channel
123 drive-belt mounting chamber
124 upper casing
125 lower casing
13 drive belt
14 tensioning wheel
200 motor assembly
21 motor housing
211 dirty air outlet
212 clean air inlet
213 air exhaust hole
214 dirty air output pipe
215 clean air input pipe
216 motor air-suction channel
2161 first branch channel
2162 second branch channel
22 motor
221 motor shaft
222 motor casing
300 body assembly
31 body
311 body air-exhaust channel
32 bridging member
321 top plate
3211 first clearance groove
3212 second clearance groove
322 side plate
33 connecting pipe assembly
331 first connecting pipe
332 second connecting pipe
34 positioning assembly
341 first positioning piece
342 second positioning piece
35 limiting column
36 elastic member
37 dirt cup
370 dirt-cup body
3701 dirt-cup upper cover
3702 dirt-cup lower cover
371 separating chamber
372 air inlet
373 air outlet
38 wheel
39 air exhaust pipe
51 air-inlet pipe
52 first hose
600 directional control valve
61 three-way pipe
611 first pipe section
612 second pipe section
613 third pipe section
62 two-way pipe
621 fourth pipe section
622 fifth pipe section
631 first air hole
632 second air hole
633 third air hole 634 fourth air hole
900 cyclonic separating device
92 filter
92a filter inlet
922a filter pore
92b filter outlet
920 second cylindrical surface
921 first section
922 second section
93 cyclonic cone assembly
930 first cylindrical surface
930a spiral channel
931 cyclone
932 cyclonic guide
9321 sleeve
9322 guide plate
94 filter cotton assembly

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides many different embodiments or examples to realize different structures of the present disclosure. To simplify the description of the present disclosure, components and configurations in specific examples are elaborated. Of course, they are only explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

A floor brush assembly for an upright vacuum cleaner 1 according to embodiments of the first aspect of the present disclosure will be described with reference to FIGS. 1 to 20.

The floor brush assembly of the upright vacuum cleaner 1 according to the embodiments of the present disclosure includes a brushroll 11, a motor 22 and a brushroll casing 12. Specifically, the motor 22 drives the brushroll 11 to roll via a drive belt 13 that is winded upon a motor shaft 221 of the motor 22 and a central part of the brushroll 11; the brushroll casing 12 is provided outside the brushroll 11, has a dust suction port and defines a brushroll air-suction channel 122 communicated with the dust suction port and a drive-belt mounting chamber 123 for mounting the drive belt 13, in which the brushroll air-suction channel 122 includes a first air-suction channel 1221 and a second air-suction channel 1222 located at both sides of the drive-belt mounting chamber 123.

Figure 2:
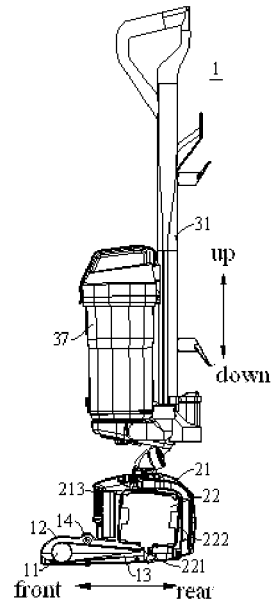
FIG. 2 is a side view of the upright vacuum cleaner of FIG. 1 when a motor is located at a first oblique position.

Referring to FIG. 1 and FIG. 2, the brushroll 11 extends along a horizontal direction (i.e. a left-and-right direction as shown in FIG. 1); a motor 22 is disposed in rear of the brushroll 11, and the motor shaft 221 of the motor 22 is connected with the brushroll 11 to drive the rotation of the brushroll 11 around its own center of rotation, so as to sweep the floor; dusts, debris and dirty air swept by the brushroll 11 are sucked into a brushroll air-suction channel 122 via a dust suction port of the brushroll casing 12 and are processed in the body assembly 300.

Further, the brushroll casing 12 has the brushroll air-suction channel 122 and the drive-belt mounting chamber 123 for mounting the drive belt 13. Referring to FIG. 9, the brushroll casing 12 is formed as a T shape. That is, the brushroll casing 12 includes a brush casing extending along the horizontal direction (i.e. the left-and-right direction shown in FIG. 11) and a belt casing extending along the vertical direction (i.e. the front-and-rear direction shown in FIG. 11). The brushroll casing 12 defines the drive-belt mounting chamber 123 and the brushroll air-suction channel 122 located at both sides of the drive-belt mounting chamber 123; the brushroll 11 is rotatably provided in the brushroll air-suction channel 122 and the rotating axis of the brushroll 11 extends along a length direction of the brush casing; the drive belt 13 is rotatably provided within the drive-belt mounting chamber 123. Further, the brushroll air-suction channel 122 and the drive belt 13 are separated. The second end of the drive belt 13 is winded upon the brushroll 11 and the first end thereof is winded upon the motor shaft 221; the drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

The first air-suction channel 1221 and the second air-suction channel 1222 are located at both sides of the drive-belt mounting chamber 123 respectively and spaced apart from the drive-belt mounting chamber 123. That is, the brushroll air-suction channel 122 is separated from the drive belt 13. The first end of the drive belt 13 is winded upon the lower end of the motor shaft 221 and the second end of the drive belt 13 is winded upon the brushroll 11; the first air-suction channel 1221 and the second air-suction channel 1222 are spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37. The drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

In the floor brush assembly of the upright vacuum cleaner 1 according to embodiments of the present disclosure, it is possible to achieve the effect of dust suction at both sides of the drive belt 13 by disposing the first air-suction channel 1221 and the second air-suction channel 1222 at both sides of the drive belt 13, so as to expand the range of dust suction and improve the working efficiency of the upright vacuum cleaner 1. Moreover, the upright vacuum cleaner 1 controls the rotation of the brushroll 11 and generation of a dust suction flow simultaneously by one motor, which occupies smaller space with fewer parts but realizes synchronous control over dust sweep and dust suction. Additionally, the motor of the upright vacuum cleaner 1 is disposed vertically to reduce the occupation space of the upright vacuum cleaner and facilitate diverse arrangements of various parts of the upright vacuum cleaner 1.

Preferably, according to an embodiment of the present disclosure, the first air-suction channel 1221 and the second air-suction channel 1222 are disposed symmetrically with respect to the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the balance of dust suction at both sides of the drive belt 13.

Alternatively, the rotating axis of the motor 22 is disposed in perpendicular to that of the brushroll 11, and the drive belt 13 is disposed at the twist angle of 90°. Referring to FIG. 1 and FIG. 2, the brushroll 11 is disposed in a horizontal plane and the rotating axis of the brushroll 11 extends along the horizontal direction; the motor 22 is disposed vertically within a motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are disposed in perpendicular to each other, so the upper half of the drive belt 13 and the lower half thereof are both twisted between the brushroll 11 and the motor shaft 221 for one time, and the twist angle of two ends of each section of the drive belt 13 is 90°.

In some specific examples of the present disclosure, the motor shaft 221 of the motor 22 is disposed vertically. Specifically, the motor 22 mainly includes a motor body and a motor casing 222. The motor body is provided within the motor casing 222 and is constituted by a core and the motor shaft 221. The motor shaft 221 of the motor 22 is connected with the core of the motor 22, and the motor 22 is arranged vertically. When the upright vacuum cleaner 1 is in non-working state, an upper end of the motor shaft 221 is disposed obliquely backwards relative to the vertical direction (i.e. the up-and-down direction shown in FIG. 3). During the dust suction of the upright vacuum cleaner 1, a central axis of the motor shaft 221 extends along the vertical direction. That is, the first end of the motor shaft 221 of the upright vacuum cleaner 1 may extend downwards relative to the core along the vertical direction (i.e. the up-and-down direction shown in FIG. 3). The first end of the drive belt 13 is winded upon the lower end of the motor shaft 221 and the second end of the drive belt 13 is winded upon the brushroll 11. Because the rotating axis of the brushroll 11 is disposed in the horizontal plane, the drive belt 13 is twisted at least one time between the brushroll 11 and the motor shaft 221. That is, the twist angle of the drive belt 13 between the alterable contact point of the drive belt 13 and the motor shaft 221 and the alterable contact point of the drive belt 13 and the brushroll 11 is 90°.

When the body 31 is at the upright position, the axis of the motor shaft 221 of the motor 22 is disposed obliquely backwards relative to the axis of the motor housing 21, in which case the two ends of the drive belt 13 are winded upon the motor shaft 221 and the brushroll 11 respectively, but the drive belt 13 is loosened. When the body 31 is at the oblique position, the axis of the motor 22 extends along the vertical direction. That is, the motor 22 is in an upright state, such that the drive belt 13 is tensioned. Specifically, when the body 31 is manipulated from the upright position to the oblique position, the lower end of the motor shaft 221 moves backwards gradually, to increase the distance between the lower end of the motor shaft 221 and the brushroll 11 and thus to tension the drive belt 13.

The floor brush assembly of the upright vacuum cleaner 1 further includes a stopping piece (not shown) disposed below the drive belt 13 and adjacent to the motor 22 to prevent the drive belt 13 from falling off from the motor shaft 221. For example, the stopping piece may be a snap spring provided on the motor shaft 221, and the snap spring may be provided at a free end of the motor shaft 221 to locate an end of the drive belt 13 connected with the motor shaft 221 above the snap spring, so as to avoid the drive belt 13 from sliding off from the motor shaft 221. The stopping piece may be constituted by the structure of the free end of the motor shaft 221. Of course, the present disclosure is not limited thereby—the stopping piece may be provided on another part below the drive belt 13 to prevent the drive belt 13 from sliding off from the motor shaft 221. Thus, by disposing the stopping piece below the drive belt 13, it is possible to prevent the drive belt 13 from sliding off from the motor shaft 221 and guarantee the reliability of the operation of the drive belt 13, further to ensure normal operation of the upright vacuum cleaner 1.

The brushroll 11 mainly includes a first brushroll section 111, a second brushroll section 112 and a connecting-shaft section 113. Specifically, an end of the first brushroll section 111 and an end of the second brushroll section 112 are connected with two ends of the connecting-shaft section 113 respectively. Referring to FIG. 1 and FIG. 2, the brushroll 11 is rotatably provided in the brushroll casing 12, and the motor 22 and the brushroll 11 are connected to drive the rotation of the brushroll 11 around its rotating axis. The first brushroll section 111, the second brushroll section 112 and the connecting-shaft section 113 are configured as columns extending along the horizontal direction (i.e. the left-and-right direction shown in FIG. 14). The right end of the first brushroll section 111 is connected with the left end of the connecting-shaft section 113; the left end of the second brushroll section 112 is connected with the right end of the connecting-shaft section 113. Bristles may be provided to the respective outer side walls of the first brushroll section 111 and the second brushroll section 112 to clean the corresponding walls, but no bristle is provided on the connecting-shaft section 113 to facilitate connection with the drive belt 13.

Further, the drive belt 13 is winded upon the motor shaft 221 of the motor 22 and the connecting-shaft section 113, such that the brushroll 11 is driven to roll by the motor 22. Referring FIG. 2, the motor 22 is provided in the motor housing 21 and is connected with a fan and the brushroll 11 respectively. The motor 22 may drive the rotation of the fan to generate an air flow to provide a vacuuming power; and the motor 22 may drive the rotation of the brushroll 11 around its own axis to realize the purpose of cleaning the floor.

Referring to FIG. 2, the brushroll 11 and the motor 22 are spaced apart in the front-and-rear direction, and the brushroll 11 is located at the front side of the motor 22. The first end of the drive belt 13 is winded upon the motor shaft 221 of the motor 22 while the second end of the drive belt 13 is winded upon the brushroll 11. When the motor shaft 221 of the motor 22 rotates, the motor shaft 221 drives the rotation of the drive belt 13 due to the frictional resistance between the motor shaft 221 and the surface of the drive belt 13. Similarly, the drive belt 13 drives the rotation of the brushroll 11 around its own axis due to the frictional resistance between the brushroll 11 and the surface of the drive belt 13, so as to realize the rotation of the brushroll 11 driven by the motor 22.

By disposing the drive belt 13 between the motor 22 and the brushroll 11, the motor 22 may drive the fan and the rotation of the brushroll 11 simultaneously. Compared with the vacuum cleaner in the related art that realizes control over the rotation of the fan and the brushroll 11 respectively by two motors 22, the upright vacuum cleaner 1 has the simple structure and fewer parts, so it occupies the small space and is easy to assemble, which improves the assembling efficiency, and may realize synchronous control over dust sweep and dust suction as well. Additionally, the motor of the upright vacuum cleaner 1 is disposed vertically to reduce the occupation space of the upright vacuum cleaner and facilitate diverse arrangements of various parts of the upright vacuum cleaner 1.

The brushroll 11 further includes a first baffle 114 and a second baffle 115. Specifically, the first baffle 114 is provided between the connecting-shaft section 113 and the first brushroll section 111 to separate the connecting-shaft section 113 from the first brushroll section 111; the second baffle 115 is provided between the connecting-shaft section 113 and the second brushroll section 112 to separate the connecting-shaft section 113 from the second brushroll section 112.

Figure 14:
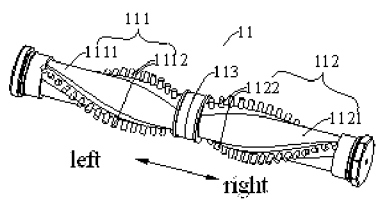
FIG. 14 is a schematic view of a brushroll of an upright vacuum cleaner according to an embodiment of the present disclosure.
Figure 15:
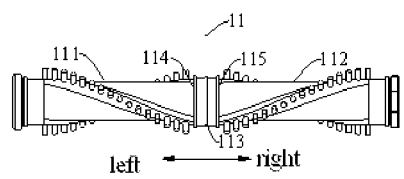
FIG. 15 is a front view of the brushroll of the upright vacuum cleaner shown in FIG. 14.

Referring to FIG. 14 and FIG. 15, the brushroll 11 mainly includes the first brushroll section 111, the second brushroll section 112, the connecting-shaft section 113, the first baffle 114 and the second baffle 115. The first baffle 114 and the second baffle 115 are disposed at left and right ends of the connecting-shaft section 113. Specifically, the first baffle 114 is provided between the first brushroll section 111 and the connecting-shaft section 113, and the left side of the first baffle 114 is connected with the right end of the first brushroll section 111, the right side of the first baffle 114 connected with the left end of the connecting-shaft section 113; the second baffle 115 is provided between the connecting-shaft section 113 and the second brushroll section 112, and the left side of the second baffle 115 is connected with the right end of the connecting-shaft section 113, the right side of the second baffle 115 connected with the left end of the second brushroll section 112.

Consequently, the first baffle 114 and the second baffle 115 disposed at two ends of the connecting-shaft section 113 may serve for positioning, and prevent the drive belt 13 from slipping off from the connecting-shaft section 113, i.e. prevent the drive belt 13 sliding off to the first brushroll section 111 or the second brushroll section 112, which may affect the operation of the drive belt 13.

Referring to FIG. 9, the brushroll casing 12 is formed as a T shape, and defines the first air-suction channel 1221, the second air-suction channel 1222, and the drive-belt mounting chamber 123. The first brushroll section 111 is rotatably provided in the first air-suction channel 1221, and the second brushroll section 112 is rotatably provided in the second air-suction channel 1222, and the drive belt 13 is movably provided in the drive-belt mounting chamber 123.

The first air-suction channel 1221 and the second air-suction channel 1222 may be spaced apart and disposed at the left and right sides of the drive-belt mounting chamber 123, such that the dirty air and dust sucked through the dust suction port of the brushroll casing 12 are delivered into the first air-suction channel 1221 and the second air-suction channel 1222 respectively, and then mixed together to flow into the dirt cup 37. Specifically, the first air-suction channel 1221 and the second air-suction channel 1222 may be defined by the parts provided in the brushroll casing 12 or by the inner wall of the brushroll casing 12. Of course, the present disclosure is not limited thereby—the first air-suction channel 1221 and the second air-suction channel 1222 may be communicated with each other. That is, the space in the brushroll casing 12 belongs to the first air-suction channel 1221 and the second air-suction channel 1222, except the drive-belt mounting chamber 123, and the dirty air and dust sucked through the dust suction port of the brushroll casing 12 are delivered into the dirt cup 37 via the drive-belt mounting chamber 123.

Therefore, by disposing the first baffle 114 and the second baffle 115 at two ends of the connecting-shaft section 113, it is convenient to dispose a baffle in the brushroll casing 12, such that the brushroll casing 12 may define the first air-suction channel 1221, the second air-suction channel 1222, and the drive-belt mounting chamber 123 spaced apart from each other, to prevent the dust and debris in the first air-suction channel 1221 and the second air-suction channel 1222 from winding upon the drive belt 13 and the motor shaft 221 and to guarantee the stability and reliability of the operation of the drive belt 13 and the motor 22, so as to ensure the normal working of the upright vacuum cleaner 1. Furthermore, the first baffle 114 and the second baffle 115 may guarantee the sealing performance of the drive-belt mounting chamber 123 to prevent the dust from entering the drive-belt mounting chamber 123 and thus affecting the operation of the drive belt 13.

Specifically, according to an embodiment of the present disclosure, the first brushroll section 111 includes a first body 1111 and a first bristle 1112 provided on the first body 1111; the second brushroll section 112 includes a second body 1121 and a second bristle 1122 provided on the second body 1121. Referring to FIG. 14, the first body 1111 and the second body 1121 each are configured to be columns extending along the horizontal direction (i.e. the left and right direction shown in FIG. 49), and are disposed co-axially and connected with the left and right ends of the connecting-shaft section 113 respectively. The first bristle 1112 is provided on a side wall of the first body 1111, and the second bristle 1122 is provided on a side wall of the second body 1121. Two ends of the drive belt 13 are winded upon the motor shaft 221 of the motor 22 and the connecting-shaft section 113 of the brushroll 11. The motor 22 drives the rotation of the brushroll 11 around its own rotating axis by the drive belt 13, and the first bristle 1112 on the first body 1111 and the second bristle 1122 on the second body 1121 clean the floor along with the rotation of the brushroll 11. Preferably, the first body 1111 and the second body 1121 each are configured to be cylindrical, and the first body 1111 has the same radial size as the second body 1121, and the first bristle 1112 and the second bristle 1122 extend outwards along the first body 1111 and the second body 1121 respectively.

Alternatively, there is a plurality of first bristles 1112, and each first bristle 1112 is spirally winded upon the first body 1111 in the same direction; there is a plurality of second bristles 1122, and each second bristle 1122 is spirally winded upon the second body 1121 in the same direction. Referring to FIG. 14, the plurality of first bristles 1112 are spaced apart and disposed on the side wall of the first body 1111, and each first bristle 1112 is spirally winded upon the side peripheral wall of the first body 1111 in the same direction. Advantageously, the plurality of first bristles 1112 are spirally winded upon the first body 1111 in the same direction along the axial direction of the first body 1111. A plurality of second bristles 1122 are spaced apart and disposed on the side wall of the second body 1121, and each second bristle 1122 is spirally winded upon the second body 1121 along the axial direction of the second body 1121. Advantageously, the plurality of second bristles 1122 are winded upon the second body 1121 in the same direction along the axial direction of the second body 1121. The coiling directions of the first bristles 1112 and the second bristles 1122 may be identical or different.

Thus, by disposing the first bristle 1112 on the first body 1111 and disposing the second bristle 1122 on the second body 1121, it is possible to realize the purpose of cleaning dust at two sides of the drive belt 13 simultaneously, which enlarges the dust sweeping area of the upright vacuum cleaner 1. In addition, each first bristle 1112 is spirally winded upon the first body 1111 in the same direction and each second bristle 1122 is spirally winded upon the second body 1121 in the same direction, which may improve the effect of sweeping dust of the brushroll 11 and guarantee the aesthetic outlook of the brushroll 11.

In some specific embodiments of the present disclosure, the coiling directions of the first bristles 1112 and the second bristles 1122 are reverse. Referring to FIG. 14, each first bristle 1112 on the first body 1111 is counterclockwise spirally winded upon the side peripheral wall of the first body 1111 along the axial direction of the first body 1111 from left to right; each second bristle 1122 on the second body 1121 is clockwise spirally winded upon the side peripheral wall of the second body 1121 along the axial direction of the second body 1121 from left to right; and bristles at left and right sides clean the floor from outside to inside to improve the effect of dust sweep. Preferably, the motor 22 drives the brushroll 11 rotating clockwise around its own rotating axis by the drive belt 13, which conform to the usage habit and is easy to operate.

In some examples of the present disclosure, the second end of the drive belt 13 is winded upon the brushroll 11 and located in the middle of the brushroll 11. The brushrolles 11 on two sides of the drive belt 13 sweep dust respectively, such that the dust and dirty air are sucked into the first air-suction channel 1221 and the second air-suction channel 1222 from the dust suction port, then into the dirt cup 37 for filtration, and finally the clean air is discharged from the air exhaust hole 213 of the motor housing 21. It shall be noted that the middle part is a relative term, and may refer to a part between the left and right ends of the brushroll 11 rather than be limited to the very central part. Specifically, the middle part may refer to a part between the very central part and the left end, or a part between the very central part and the right end.

Preferably, according to an embodiment of the present disclosure, a first brushroll 11 and a second brushroll 11 are disposed symmetrically with respect to the drive belt 13. That is, the first brushroll section 111 has the same length in the axial direction as the second brushroll section 112. The first brushroll section 111 and the second brushroll section 112 are disposed symmetrically relative to the central part of the connecting-shaft section 113. The second end of the drive belt 13 is winded upon the connecting-shaft section 113, and the first end thereof is winded upon the motor shaft 221 of the motor 22. That is, the drive belt 13 divides the brushroll 11 into the symmetric first brushroll section 111 and second brushroll section 112. Consequently, the first brushroll section 111 and the second brushroll section 112 are subjected to balanced resistance to guarantee the stability of the brushroll 11, and the two sides of the drive belt 13 have the same cleaning scope.

According to an embodiment of the present disclosure, the respective central axes of the first brushroll section 111, the second brushroll section 112 and the connecting-shaft section 113 are located in the same line. That is, the first brushroll section 111, the second brushroll section 112 and the connecting-shaft section 113 are disposed co-axially. The motor 22 drives the first brushroll section 111, the second brushroll section 112 and the connecting-shaft section 113 rotating simultaneously, such that the floor brush assembly of the upright vacuum cleaner 1 may drive the fan, the first brushroll section 111, the second brushroll section 112 and the connecting-shaft section 113 rotating simultaneously by one motor 22, to implement the working mode of dust sweep and dust suction at both sides. Compared with the vacuum cleaner in the related art that realizes control over the rotation of the fan and the brushroll 11 respectively by two motors 22, the floor brush assembly of the upright vacuum cleaner 1 has the simple structure and fewer parts, so it occupies the small space and is easy to assemble or disassemble, which improves the assembling efficiency, and may realize synchronous control over dust sweep and dust suction as well.

In some specific embodiments of the present disclosure, the brushroll casing 12 includes a lower casing 125 and an upper casing 124 connected with the top of the lower casing 125, and the first air-suction channel 1221 and the second air-suction channel 1222 are defined by the upper casing 124 and/or the lower casing 125. Referring to FIG. 10, the brushroll casing 12 mainly includes the upper casing 124 and the lower casing 125, in which a lower end of the upper casing 124 is open. The lower casing 125 and the upper casing 124 are detachably connected to seal at least a part of the opening of the upper casing 124, and the upper casing 124 and the lower casing 125 define the dust suction port therebetween. Further, the first air-suction channel 1221, the drive-belt mounting chamber 123 and the second air-suction channel 1222 are arranged between the upper casing 124 and the lower casing 125 and spaced apart along the left-and-right direction. The first air-suction channel 1221 and the second air-suction channel 1222 are not communicated with the drive-belt mounting chamber 123 to prevent the impurities from being drawn into the drive belt 13, so as to guarantee the reliable operation of the system. The structure of the brushroll casing 12 is simple and compact, and the structure of the upper casing 124 and the lower casing 125 defines the first air-suction channel 1221, the drive-belt mounting chamber 123 and the second air-suction channel 1222 arranged in a spaced manner, which saves redundant pipes to make it simple to manufacture with low cost.

The floor brush assembly of the upright vacuum cleaner 1 further includes a tensioning wheel 14, and the tensioning wheel is opposite to a part of the drive belt 13 adjacent to the brush 11 so as to tension the drive belt 13. Referring to FIG. 2, the tensioning wheel 14 is disposed at a top wall of the brushroll casing 12 of the upright vacuum cleaner 1, located above the drive belt 13 and disposed adjacent to the brushroll 11 to adjust the degree of tensioning the drive belt 13. Further, an elastic member is disposed on an inner top wall of the brushroll casing 12 and defines two ends connected with the brushroll casing 12 and the tensioning wheel 14 to tension the drive belt 13 by the elastic member and the tensioning wheel 14 according to the practical working conditions, so as to guarantee the reliability of the operation of the system.

Consequently, by disposing the tensioning wheel 14 or the elastic member in the brushroll casing 12, it is possible to adjust the degree of tightness of the drive belt 13 to make the system operate reliably and further stabilize the operation of the drive belt 13 to prevent the drive belt 13 from slipping to guarantee the normal working of the upright vacuum cleaner 1.

The upright vacuum cleaner 1 according to embodiments of the second aspect of the present disclosure will be described with reference to FIGS. 1 to 23.

The upright vacuum cleaner 1 according to embodiments of the present disclosure includes the floor brush assembly according to the above embodiments and the body assembly 300. Specifically, the floor brush assembly further includes the motor housing 21 that is provided outside the motor 22, has an air exhaust hole 213, a dirty air outlet 211 and a clean air inlet 212, and defines a motor air-suction channel 216 and a motor air-exhaust channel, in which the motor air-suction channel 216 is communicated between the brushroll air-suction channel 122 and the dirty air outlet 211 while the motor air-exhaust channel is communicated between the clean air inlet 212 and the air exhaust hole 213.

In other words, the floor brush assembly of the upright vacuum cleaner 1 mainly includes a brushroll assembly 100 and the motor assembly 200; the upright vacuum cleaner 1 mainly includes the brushroll assembly 100, the motor assembly 200 and the body assembly 300.

The brushroll assembly 100 mainly includes the brushroll casing 12 and the brushroll 11. The brushroll casing 12 defines the brushroll air-suction channel 122, and has the dust suction port communicated with the brushroll air-suction channel 122. The brushroll 11 is rotatably provided in the brushroll casing 12. Referring to FIG. 1 and FIG. 2, the brushroll 11 extends along the horizontal direction (i.e. the left-and-right direction shown in FIG. 1); the drive belt 13 is provided between the motor assembly 200 and the brushroll 11 and connected with the motor 22 and the brushroll 11 respectively. When the motor shaft 221 of the motor 22 rotates, the motor shaft 221 drives the rotation of the drive belt 13 due to the frictional resistance between the motor shaft 221 and the surface of the drive belt 13. Similarly, the drive belt 13 drives the rotation of the brushroll 11 around its own axis due to the frictional resistance between the brushroll 11 and the surface of the drive belt 13, such that the brushroll 11 is driven to rotate by the motor 22, so as to realize the purpose of cleaning the floor.

The motor assembly 200 includes the motor housing 21 and the motor 22 provided in the motor housing 21. The motor housing 21 has the air exhaust hole 213, the dirty air outlet 211 and the clean air inlet 212, and defines the motor air-suction channel 216 and the motor air-exhaust channel. The motor air-suction channel 216 is communicated between the brushroll air-suction channel 122 and the dirty air outlet 211, and the motor air-exhaust channel is communicated between the clean air inlet 212 and the air exhaust hole 213.

Figure 3:
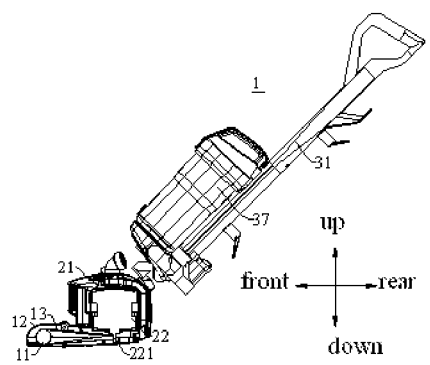
FIG. 3 is a side view of the upright vacuum cleaner of FIG. 1 when a motor is located at a first upright position.
Figure 4:
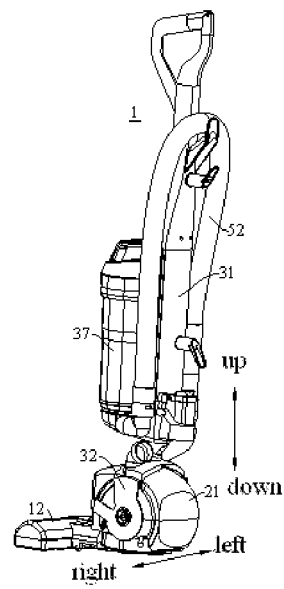
FIG. 4 is a schematic view of the upright vacuum cleaner of FIG. 1 in a direction.

Referring to FIG. 2 and FIG. 3, the motor assembly 200 mainly includes the motor housing 21 and the motor 22. The motor housing 21 defines the motor air-suction channel 216 and the motor air-exhaust channel spaced apart. The motor housing 21 has the dirty air outlet 211 communicated with the motor air-suction channel 216 and the brushroll air-suction channel 122 respectively, and has the clean air inlet 212 and the air exhaust hole 213 communicated with the motor air-exhaust channel respectively.

Specifically, the dirty air and dust are introduced into the brushroll air-suction channel 122 via the dust suction port of the brushroll casing 12, then into a motor air-suction channel 216 in the motor housing 21, and discharged into the body assembly 300 via the dirty air outlet 211 on the motor housing 21; clean air obtained by filtration of the body assembly 300 enters the motor air-exhaust channel within the motor housing 21 via the clean air inlet 212 of the motor housing 21 and then is discharged to the outside via an air exhaust hole 213 on the motor housing 21.

Further, the body assembly 300 includes a body 31 and a dirt cup 37 mounted on the body 31 and having a separating chamber 371 communicated with the dirty air outlet 211 and the clean air inlet 212 respectively. That is, the body assembly 300 mainly includes a body 31 and a dirt cup 37, and the dirt cup 37 is detachably provided on the body 31 and defines the separating chamber 371 that is communicated with the dirty air outlet 211 and the clean air inlet 212 on the motor housing 21 respectively. Specifically, dirty air and dust are introduced into the brushroll air-suction channel 122 via the dust suction port of the brushroll casing 12, then into a motor air-suction channel 216 in the motor housing 21, and discharged into the separating chamber 371 of the dirt cup 37 via the dirty air outlet 211 on the motor housing 21; clean air through filtration and processing of the dirt cup 37 enters a motor air-exhaust channel within the motor housing 21 via the clean air inlet 212 on the motor housing 21 and is discharged to the outside via an air exhaust hole 213 on the motor housing 21.

Therefore, in the upright vacuum cleaner 1 according to the present disclosure, the motor air-suction channel 216 and the motor air-exhaust channel are disposed in the motor housing 21 to facilitate the transmission of dirty air and clean air, which may not only utilize the space in the motor housing 21 effectively to improve the space utilization rate, but also reduce the number of pipes to save the cost and improve the efficiency of assembling or disassembling the upright vacuum cleaner 1 at the same time of guaranteeing the compact structure and aesthetic outlook of the upright vacuum cleaner 1. Additionally, the motor of the upright vacuum cleaner 1 is disposed vertically to reduce the occupation space of the upright vacuum cleaner 1 and facilitate diverse arrangements of various parts of the upright vacuum cleaner 1.

Figure 5:
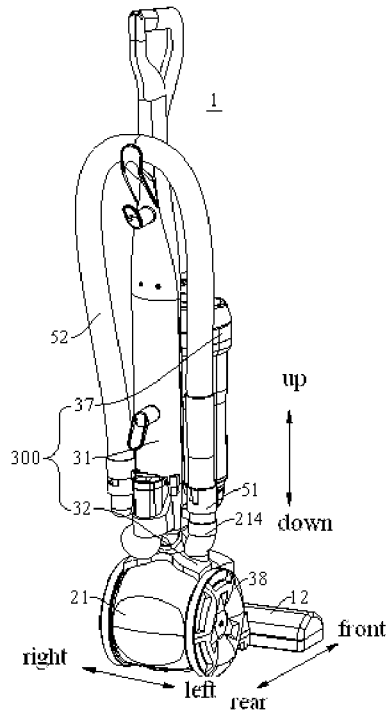
FIG. 5 is a schematic view of an upright vacuum cleaner according to another embodiment of the present disclosure.
Figure 6:
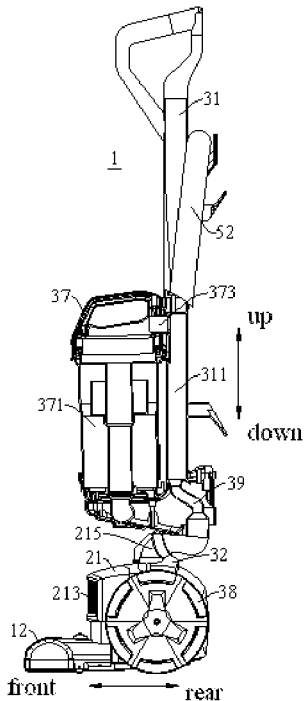
FIG. 6 is a side view of the upright vacuum cleaner of FIG. 5.
Figure 7:
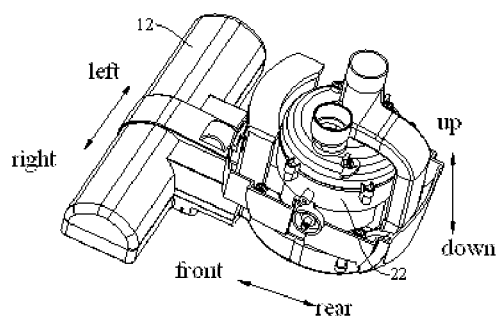
FIG. 7 is a schematic view of a floor brush assembly for an upright vacuum cleaner according to an embodiment of the present disclosure.
Figure 8:
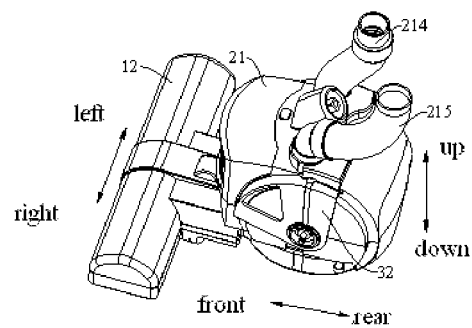
FIG. 8 is a schematic view of a floor brush assembly for an upright vacuum cleaner according to another embodiment of the present disclosure.

According to an embodiment of the present disclosure, the dirty air outlet 211 is connected to the dirt cup 37 by an air-inlet pipe assembly so as to be communicated with the separating chamber 371. Specifically, as shown in FIG. 5 and FIG. 6, two ends of the air-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 is charged to the outside through the air exhaust hole 213 of the motor housing 21. Thus, the air-inlet pipe assembly disposed between the dirt cup 37 and the dirty air outlet 211 may not only serve to transmit dirty air and dust to guarantee the communication of the flow channels, but also prolong the separation time of the dust to improve the dust suction effect of the upright vacuum cleaner 1.

Alternatively, according to an embodiment of the present disclosure, the air-inlet pipe assembly includes an air-inlet pipe 51 and the first hose 52. Specifically, the air-inlet pipe 51 is provided on the motor housing 21 and defines a first end communicated with the dirty air outlet 211, and the first hose 52 is connected between a second end of the air-inlet pipe 51 and an air inlet 372 of the dirt cup 37.

Referring to FIG. 5, the air-inlet pipe assembly mainly includes the air-inlet pipe 51 and the first hose 52. The air-inlet pipe 51 is fixed on the motor housing 21 and the first end of the air-inlet pipe 51 is communicated with the dirty air outlet 211 on the motor housing 21 and the second end thereof is communicated with a first end of the first hose 52; a second end of the first hose 52 is communicated with the separating chamber 371 of the dirt cup 37. Advantageously, the length of the first hose 52 may be greater than that of the body 31 to prolong the separation time and the filtration time of the dust and dirty air and increase the dust suction capacity, so as to improve the working efficiency of the upright vacuum cleaner 1. Further, the middle part of the first hose 52 may be hanged on the body 31 to make the structure compact. Alternatively, the first hose 52 may be a plastic first hose 52 or a rubber first hose 52, so as to facilitate coiling up the first hose 52 to save space and improve the space utilization rate.

In some other specific embodiments of the present disclosure, the first hose 52 is detachably connected between the second end of the air-inlet pipe 51 and the air inlet 372 of the dirt cup 37. That is, the first end of the first hose 52 may be detached from the second end of the air-inlet pipe 51 according to practical requirements. In other words, the upright vacuum cleaner 1 may suck dust directly through the first hose 52 without using the brushroll 11. Thus, the upright vacuum cleaner 1 has a simple and compact structure and is easy to assemble or disassemble. It is possible for users to choose an appropriate vacuuming mode according to practical working conditions, which provides good user experience and a high working efficiency with easy operations.

According to an embodiment of the present disclosure, the body 31 defines a body air-exhaust channel 311 therein. A first end of the body air-exhaust channel 311 is connected to an air outlet 373 of the dirt cup 37 and communicated to the separating chamber 371, and a second end of the body air-exhaust channel 311 is communicated with the clean air inlet 212.

Referring to FIG. 6, the dirt cup 37 has the air outlet 373 communicated with the separating chamber 371, and the body 31 defines the body air-exhaust channel 311 extending along the length direction of the body 31. An upper end of the body air-exhaust channel 311 is communicated with the air outlet 373 of the dirt cup 37 and a lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create an aesthetic outlook.

Further, the second end (i.e. the lower end shown in FIG. 6) of the body air-exhaust channel 311 is communicated with the clean air inlet 212 through an air exhaust pipe 39. Specifically, the motor 22 is disposed below the body 31; the air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curve pipe extending from an outlet of the body air-exhaust channel 311 to the clean air inlet 212.

As shown in FIG. 1 to FIG. 15, the upright vacuum cleaner 1 according to the embodiments of the present disclosure includes the brushroll 11, the motor 22, the brushroll casing 12 and the dirt cup 37. Specifically, the motor 22 drives the brushroll 11 to roll via the drive belt 13; the brushroll casing 12 has the drive-belt mounting chamber 123 for mounting the drive belt 13, the first air-suction channel 1221 and the second air-suction channel 1222 that are located at both sides of the drive belt 13; the dirt cup 37 is communicated with the first air-suction channel 1221 and the second air-suction channel 1222.

In other words, the upright vacuum cleaner 1 mainly includes the brushroll 11, the motor 22, the brushroll casing 12 and the dirt cup 37. The motor 22 is provided within the upright vacuum cleaner 1; the rotating axis of the brushroll 11 extends along the horizontal direction (i.e. the left-and-right direction shown in FIG. 1); the drive belt 13 is provided between the motor 22 and the brushroll 11 and connected with the motor 22 and the brushroll 11 respectively. The motor 22 drives the brushroll 11 via the drive belt 13 to realize the purpose of cleaning the floor.

Referring to FIG. 1, the brushroll casing 12 is formed as a T shape. That is, the brushroll casing 12 includes a brush casing extending along the horizontal direction (i.e. the left-and-right direction shown in FIG. 9) and a belt casing extending along the vertical direction (i.e. the front-and-rear direction shown in FIG. 9). The brushroll casing 12 defines the drive-belt mounting chamber 123 and the brushroll air-suction channel 122 located at both sides of the drive-belt mounting chamber 123; the brushroll 11 is rotatably disposed in the brushroll air-suction channel 122 and the rotating axis of the brushroll 11 extends along a length direction of the brush casing; the drive belt 13 is rotatably disposed within the drive-belt mounting chamber 123.

The second end of the drive belt 13 is winded upon the brushroll 11 and located in the middle of the brushroll 11. The brushrolles 11 at both sides of the drive belt 13 sweep dust independently, and the dust and dirty air are sucked into the brushroll casing 12 from the dust suction port and then enters the dirt cup 37 for filtration. Finally, clean air is discharged from the air exhaust hole 213 of the motor housing 21. It shall be noted herein that the middle part is a relative term, and may refer to a part between the left and right ends of the brushroll 11 rather than be limited to the very central part. Specifically, the middle part may refer to a part between the very central part and the left end, or a part between the very central part and the right end.

Further, the brushroll air-suction channel 122 includes a first air-suction channel 1221 and a second air-suction channel 1222 located at both sides of the drive-belt mounting chamber 123. Referring to FIG. 11, the first air-suction channel 1221 and the second air-suction channel 1222 are located at left and right sides respectively, and the dirty air and dust sucked through the brushroll casing 12 are delivered to the dirt cup 37 through the first air-suction channel 1221 and the second air-suction channel 1222 respectively. The first air-suction channel 1221 and the second air-suction channel 1222 may be spaced apart and disposed at the left and right sides, such that the dirty air and dust sucked through the dust suction port of the brushroll casing 12 are delivered into the first air-suction channel 1221 and the second air-suction channel 1222 respectively, and then mixed together to flow into the dirt cup 37. Specifically, the first air-suction channel 1221 and the second air-suction channel 1222 may be defined by a part in the brushroll casing 12 or by an inner wall of the brushroll casing 12. Of course, the present disclosure is not limited thereby—the first air-suction channel 1221 and the second air-suction channel 1222 may be communicated. That is, the space in the brushroll casing 12 belongs to the first air-suction channel 1221 and the second air-suction channel 1222, except the drive-belt mounting chamber 123, and the dirty air and dust sucked through the dust suction port of the brushroll casing 12 are delivered into the dirt cup 37 via the drive-belt mounting chamber 123.

Therefore, by disposing the drive belt 13 between the motor 22 and the brushroll 11, the motor 22 may control drive the brushroll 11 and the rotation of the fan simultaneously, which utilizes fewer parts and occupies smaller space, but realizes synchronous control over dust sweep and dust suction. In addition, by disposing the first air-suction channel 1221 and the second air-suction channel 1222 at both sides of the drive belt 13 (i.e. disposing the drive belt 13 in the middle of the brushroll 11), it is possible to achieve the effect of dust suction at both sides of the drive belt 13, so as to expand the range of dust suction and improve the working efficiency of the upright vacuum cleaner 1. The upright vacuum cleaner 1 has a simple and compact structure, so it occupies a small space and is easy to operate, resulting in a high working efficiency.

Specifically, the first air-suction channel 1221 and the second air-suction channel 1222 are located at both sides of the drive-belt mounting chamber 123 respectively and spaced apart from the drive-belt mounting chamber 123. That is, the brushroll air-suction channel 122 is separated from the drive belt 13. The first end of the drive belt 13 is winded upon the lower end of the motor shaft 221 and the second end of the drive belt 13 is winded upon the brushroll 11; the first air-suction channel 1221 and the second air-suction channel 1222 are spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37. The drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

Preferably, an end of the drive-belt mounting chamber 123 just corresponds to the central part in the direction of the axis of the brushroll 11. Referring to FIG. 12, the end of the drive belt 13 is winded upon the very middle of the brushroll 11 to make two ends of the brush roller 11 under balanced forces and ensure that the motor 22 may drive the brush roller 11 operating stably. The first air-suction channel 1221 and the second air-suction channel 1222 each include the lateral air-suction channel section and the longitudinal air-suction channel section. The lateral air-suction channel section extends axially along the brushroll 11, and the longitudinal air-suction channel section extends in the direction axially perpendicular to the brushroll 11 and is communicated with the corresponding lateral air-suction channel section.

Alternatively, the first air-suction channel 1221 and the second air-suction channel 1222 are formed as an L shape respectively and disposed in a back-to-back manner. The axis of the drive-belt mounting chamber 123 is connected to the very center of the brushroll casing 12. That is, the end of the drive belt 13 is connected with the very center of the brushroll 11. The drive-belt mounting chamber 123 is located between the first air-suction channel 1221 and the second air-suction channel 1222. When the brushroll 11 is mounted within the brushroll casing 12, the brushroll 11 is driven to roll by the motor 22 via the drive belt 13, so as to realize the purpose of cleaning the floor.

Preferably, according to an embodiment of the present disclosure, the first air-suction channel 1221 and the second air-suction channel 1222 are disposed symmetrically at both sides of the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the balance of dust suction at both sides of the drive belt 13.

According to an embodiment of the present disclosure, the upright vacuum cleaner 1 further includes the motor housing 21 for accommodating the motor 22, and the motor housing 21 has a first branch channel 2161 communicated with the first air-suction channel 1221 and a second branch channel 2162 communicated with the second air-suction channel 1222.

In other words, the upright vacuum cleaner 1 mainly includes the brushroll 11, the motor 22, the brushroll casing 12, the dirt cup 37 and the motor housing 21. The motor housing 21 defines an accommodating chamber for mounting the motor 22 that is movably disposed in the accommodating chamber of the motor housing 21. Referring to FIG. 13, the motor housing 21 is configured as a hollow column and defines the first branch channel 2161 and the second branch channel 2162 therein that are spaced apart from each other. The motor 22 is located between the first branch channel 2161 and the second branch channel 2162, in which a first end of the first branch channel 2161 is communicated with the first air-suction channel 1221 and a first end of the second branch channel 2162 is communicated with the second air-suction channel 1222, while a second end of the first branch channel 2161 and a second end of the second branch channel 2162 are communicated with the dirt cup 37 respectively.

Alternatively, the first branch channel 2161 and the second branch channel 2162 are disposed oppositely and located at left and right sides of the drive belt 13. That is, the first air-suction channel 1221 is communicated with the first branch channel 2161 and disposed at the left side of the drive belt 13, while the second air-suction channel 1222 is communicated with the second branch channel 2162 and disposed at the right side of the drive belt 13, such that a part of dirty air and dust sucked into the brushroll casing 12 enters the dirt cup 37 sequentially through the first air-suction channel 1221 and the first branch channel 2161, while another part of the dirty air and dust enters the dirt cup 37 sequentially through the second air-suction channel 1222 and the second branch channel 2162.

Therefore, by disposing the first branch channel 2161 and the second branch channel 2162 symmetrically at the both sides of the motor 22, it is possible to utilize the space between the motor housing 21 and the motor casing 222 effectively to make the internal structure compact and improve the space utilization rate; it is also possible to reduce the number of pipes to lower the cost and improve the assembling or disassembling efficiency; it is further possible to avoid the influence of external pipes during the dust suction and create an aesthetic outlook of the upright vacuum cleaner 1.

According to an embodiment of the present disclosure, the first branch channel 2161 and the second branch channel 2162 are defined by the motor casing 222 of the motor 22 and the motor housing 21.

That is, the motor 22 is mainly constituted by the motor body and the motor casing 222, in which the motor body is provided in the motor casing 222 and mainly includes the core and the motor shaft 221. The first end of the motor shaft 221 is connected with the core and the second end of the motor shaft 221 is protruded beyond the motor casing 222; the motor 22 is movably disposed within the motor housing 21; an external wall of the motor casing 222 of the motor 22 is separated apart from an inner wall of the motor housing 21 to define the first branch channel 2161 and the second branch channel 2162 therebetween. That is, the first branch channel 2161 and the second branch channel 2162 are defined by the motor casing 222 of the motor 22 and the motor housing 21. Of course, the present disclosure is not limited thereby. The first branch channel 2161 and the second branch channel 2162 may be defined by other parts (like pipes) in the motor housing 21, or by the structure of the motor housing 21.

It shall be noted that the first branch channel 2161 and the second branch channel 2162 may fill the space in the motor housing 21, except the motor 22. That is, the first branch channel 2161 and the second branch channel 2162 surround the circumference of the motor 22 and are communicated with each other. The first branch channel 2161 and the second branch channel 2162 may be individual passages that are not communicated with the accommodating chamber of the motor housing 21. Of course, the present disclosure is not limited thereby. One of the first branch channel 2161 and the second branch channel 2162 may be configured to be an individual passage not in communication with the accommodating chamber of the motor housing 21, but the other of the first branch channel 2161 and the second branch channel 2162 may be configured to fill the space of the accommodating chamber except the motor 22 and the other individual passage.

Preferably, according to an embodiment of the present disclosure, the first branch channel 2161 and the second branch channel 2162 together make up a stereoscopic space with a substantially annular cross section. Referring to FIG. 12, the first branch channel 2161 and the second branch channel 2162 are configured to be semi-annular and disposed in an opposite manner to define a cylindrical stereoscopic space in the motor housing 21 for mounting the motor 22. In other words, the first branch channel 2161 and the second branch channel 2162 surround the two sides of the motor 22 to utilize the space effectively and improve the space utilization rate.

According to an embodiment of the present disclosure, the motor housing 21 has the dirty air outlet 211 and the clean air inlet 212 communicated with the dirt cup 37; the first branch channel 2161 and the second branch channel 2162 are converged and then communicated to the dirty air outlet 211. Referring to FIG. 6 and FIG. 13, the dirt cup 37 is disposed above the motor housing 21. The motor housing 21 has the dirty air outlet 211 and the clean air inlet 212 spaced apart from each other. The dirty air outlet 211 is communicated with the dust suction port of the brushroll casing 12, the first air-suction channel 1221, the second air-suction channel 1222, the first branch channel 2161 and the second branch channel 2162, and may be communicated with the dirt cup 37 via a hose 52. The dirty air and dust sucked via the dust suction port enter the motor housing 21 respectively through the first air-suction channel 1221 and the second air-suction channel 1222 at two sides of the drive belt 13, then are delivered to the dirty air outlet 211 respectively through the first branch channel 2161 and the second branch channel 2162, and finally are delivered to the dirt cup 37 for filtration.

Alternatively, the dirty air outlet 211 is connected to the dirt cup 37 by an air-inlet pipe assembly so as to be communicated with the separating chamber 371. Specifically, as shown in FIG. 5 and FIG. 6, two ends of the air-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 sequentially through the body air-exhaust channel 311, the air exhaust pipe 39 and the clean air inlet 212 of the motor housing 21, and finally is charged to the outside through the air exhaust hole 213 of the motor housing 21. Thus, the air-inlet pipe assembly disposed between the dirt cup 37 and the dirty air outlet 211 may serve to transmit dirty air and dust and to guarantee the communication of the flow channels.

According to an embodiment of the present disclosure, the body 31 defines a body air-exhaust channel 311 therein. A first end of the body air-exhaust channel 311 is connected to an air outlet 373 of the dirt cup 37 and communicated to the separating chamber 371, and a second end of the body air-exhaust channel 311 is communicated with the clean air inlet 212.

Referring to FIG. 6, the dirt cup 37 has the air outlet 373 communicated with the separating chamber 371, and the body 31 defines the body air-exhaust channel 311 extending along the length direction of the body 31. An upper end of the body air-exhaust channel 311 is communicated with the air outlet 373 of the dirt cup 37 and a lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create an aesthetic outlook.

Further, the second end (i.e. the lower end shown in FIG. 6) of the body air-exhaust channel 311 is communicated with the clean air inlet 212 through an air exhaust pipe 39. Specifically, the motor 22 is disposed below the body 31; the air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curve pipe extending from an outlet of the body air-exhaust channel 311 to the clean air inlet 212.

Preferably, according to an embodiment of the present disclosure, the dirty air outlet 211 and the clean air inlet 212 are disposed symmetrically with respect to the central axis of the motor housing 21. Referring to FIG. 13, the dirty air outlet 211 and the clean air inlet 212 are spaced apart and disposed at left and right sides of the central axis of the motor housing 21, to make good use of the external wall of the motor housing 21 and facilitate the connection with external pipes, which forms a reasonable and compact layout.

In some specific embodiments of the present disclosure, the dirty air outlet 211 is connected with the air inlet 372 of the dirt cup 37 via a directional control valve 600. The directional control valve 600 includes a first air hole 631, a second air hole 632 and a third air hole 633. The first air hole 631 is communicated with the brushroll air-suction channel 122; the second air hole 632 is connected with the air inlet 372 of the dirt cup 37; the third air hole 633 is communicated with the outside. The directional control valve 600 is configured to switch a first state of communicating the first air hole 631 and the second air hole 632 and a second state of communicating the second air hole 632 and the third air hole 633.

Alternatively, the directional control valve 600 is detachably connected with the dirt cup 37 and the motor housing 21. The directional control valve 600 defines an airflow channel therein, and includes the first air hole 631, the second air hole 632 and the third air hole 633 communicated with the airflow channel respectively. The first air hole 631 of the directional control valve 600 is communicated with the brushroll air-suction channel 122 by the motor housing 21, the second air hole 632 thereof communicated with the dirt cup 37 and the third air hole 633 thereof communicated with the outside environment.

Figures 16, 17:
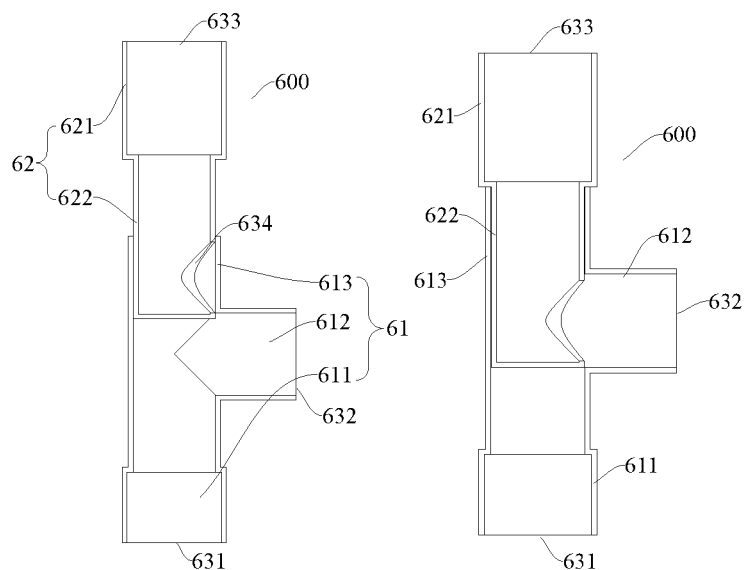
FIG. 16 is a schematic view of a directional control valve of an upright vacuum cleaner at a working state according to an embodiment of the present disclosure.
FIG. 17 is a schematic view of a directional control valve of an upright vacuum cleaner at another working state according to an embodiment of the present disclosure.

Referring to FIGS. 16 and 17, the directional control valve 600 may switch between two working conditions. When the directional control valve 600 is in the first state, the first air hole 631 of the directional control valve 600 is communicated with the second air hole 632. That is, the brushroll air-suction channel 122 is communicated with the dirt cup 37, such that the dirty air and dust sucked through the dust suction port of the brushroll casing 12 sequentially passes through the brushroll air-suction channel 122, the first air hole 631, the airflow channel of the directional control valve 600 and the second air hole 632, and then enter the dirt cup 37 for filtration. Finally the clean air obtained is discharged to the outside. When the directional control valve 600 is in the second state, the second air hole 632 is communicated with the third air hole 633. That is, the dirt cup 37 is communicated with the outside. Further, the third air hole 633 of the directional control valve 600 may be communicated with an external pipe to implement dust suction directly through the external pipe without using the brushroll 11. The dirty air and dust from the external pipe sequentially passes through the third air hole 633 of the directional control valve 600, the airflow channel of the directional control valve 600 and the second air hole 632, and then enter the dirt cup 37 for filtration. Finally the clean air obtained is discharged to the outside.

Consequently, the upright vacuum cleaner 1 according to the embodiments of the present disclosure may realize switch among different dust suction modes by disposing the directional control valve 600 on the upright vacuum cleaner 1. The user may choose the suitable dust suction mode according to the specific working condition to improve the working efficiency of the upright vacuum cleaner 1 with simple operations and great user experience. Additionally, the motor of the upright vacuum cleaner 1 is vertically disposed to reduce the occupation space of the upright vacuum cleaner 1 and facilitate diverse arrangements of various parts of the upright vacuum cleaner 1, and is easy to assemble or disassemble due to the simple and compact structure.

Alternatively, according to an embodiment of the present disclosure, the directional control valve 600 includes a three-way pipe 61 and a two-way pipe 62. Specifically, the three-way pipe 61 includes a first pipe section 611, a second pipe section 612 and a third pipe section 613 communicated with one another. The first air hole 631 is defined by a free end of the first pipe section 611, and the second air hole 632 is defined by a free end of the second pipe section 612. The two-way pipe 62 includes a fourth pipe section 621 and a fifth pipe section 622 communicated with each other. The third air hole 633 is defined by a free end of the fourth pipe section 621 and the fourth air hole 634 is defined by a free end of the fifth pipe section 622, in which at least a part of the fifth pipe section 622 is inserted into the third pipe section 613 and is movable between a first position where the first air hole 631 is communicated with the second air hole 632 and a second position where the fourth air hole 634 is communicated with the second air hole 632.

In other words, the directional control valve 600 mainly includes the three-way pipe 61 and the two-way pipe 62. The three-way pipe 61 is mainly constituted by the first pipe section 611, the second pipe section 612 and the third pipe section 613. A first end of the first pipe section 611, a first end of the second pipe section 612 and a first end of the third pipe section 613 are communicated with one another. A second end of the first pipe section 611 is provided with the first air hole 631, a second end of the second pipe section 612 provided with the second air hole 632. The two-way pipe 62 is mainly constituted by the fourth pipe section 621 and the fifth pipe section 622, in which a first end of the fourth pipe section 621 is connected with a first end of the fifth pipe section 622 and a second end of the fourth pipe section 621 is provided with the third air hole 633; a second end of the fifth pipe section 622 is provided with the fourth air hole 634.

Further, the second end of the fifth pipe section 622 is movably disposed in the third pipe section 613 of the three-way pipe 61. When the two-way pipe 62 is at the first position (i.e. the position shown in FIG. 16), the third pipe section 613 of the three-way pipe 61 is only communicated with the second air hole 632, such that the dirty air and dust sucked through the dust suction port of the brushroll casing 12 enter the dirt cup 37 for filtration sequentially through the brushroll air-suction channel 122, the first air hole 631 and the second air hole 632 of the three-way pipe 61. Finally the clean air obtained is discharged to the outside.

When the two-way pipe 62 is at the second position (i.e. the position shown in FIG. 17, the fourth air hole 634 of the two-way pipe 62 is communicated with the second air hole 632 of the three-way pipe 61. Further, the third air hole 633 of the fourth pipe section 621 may be communicated with the external pipe, then to implement dust suction directly through the external pipe without using the brushroll 11. The dirty air and dust from the external pipe sequentially passes through the third air hole 633 of the two-way pipe 62 and the second air hole 632 of the three-way pipe 61 into the dirt cup 37 for filtration. Finally the clean air obtained is discharged to the outside.

Consequently, since the detachable two-way pipe 62 and three-way pipe 61 are disposed between the dirt cup 37 and the motor housing 21, and the two-way pipe 62 may switch between the first position and the second position, it is possible to switch the two working states of the directional control valve 600, so as to realize two different dust suction modes of the upright vacuum cleaner 1 that has the simple structure and is easy to assemble and operate.

According to an embodiment of the present disclosure, the first end of the fifth pipe section 622 is connected with the fourth pipe section 621, and an end wall of the second end of the fifth pipe section 622 is enclosed, the fourth air hole 634 formed in a side wall of the second end of the fifth pipe section 622. Referring to FIG. 16, the fourth pipe section 621 is configured as a straight pipe section with two ends thereof communicated, and the fifth pipe section 622 may be configured as a straight pipe section, as well. The first end of the fifth pipe section 622 is connected with the fourth pipe section 621, and the second end of the fifth pipe section 622 is enclosed; the fourth air hole 634 communicated with the first end of the fifth pipe section 622 is disposed in the side wall of the second end of the fifth pipe section 622.

When the fifth pipe section 622 is inserted in the third pipe section 613 of the three-way pipe 61, the fifth pipe section 622 may move reciprocally along the length direction of the third pipe section 613. If the two-way pipe 62 is in the first position, the second end of the fifth pipe section 622 seals the end of the third pipe section 613, while the side of the third pipe section 613 blocks the fourth air hole 634 of the fifth pipe section 622, so as to communicate the first air hole 631 with the second air hole 632 alone, i.e. realizing the first state of the directional control valve 600. If the two-way pipe 62 is in the second position, the second end of the fifth pipe section 622 seals the first air hole 631 of the first pipe section 611, while the second air hole 632 of the second pipe section 612 is communicated with the fourth air hole 634 of the fifth pipe section 622, so as to communicate the third air hole 633 of the fourth pipe section 621 with the second air hole 632 of the second pipe section 612, i.e. realizing the second first state of the directional control valve 600.

Therefore, the fifth pipe section 622 has a structure where the first end is communicated while the second end is sealed, and is provided with the fourth air hole 634 in the side wall of the second end, so it is achievable to switch two communication states of the directional control valve 600, so as to realize two different dust suction modes of the upright vacuum cleaner 1 that has the simple structure and is easy to assemble and operate.

Further, when the two-way pipe 62 moves to the second position, the end of the fourth pipe section 621 communicated with the fifth pipe section 622 abuts against the free end of the third pipe section 613. Referring to FIG. 17, the fourth pipe section 621 has an external diameter greater than the fifth pipe section 622 to form a boss between the fourth pipe section 621 and the fifth pipe section 622. When the two-way pipe 62 is at the second position, the boss between the fourth pipe section 621 and the fifth pipe section 622 abuts against and is connected with the end of the third pipe section 613. Consequently, the boss formed between the fourth pipe section 621 and the fifth pipe section 622 may serve for positioning and guarantee the communication between the fourth air hole 634 of the fifth pipe section 622 and the second air hole 632 of the second pipe section 612, so as to communicate the second air hole 632 with the third air hole 633, which is easy to manufacture and process due to the simple structure, and may realize accurate positioning.

The upright vacuum cleaner 1 further includes a second hose that has a first end communicated to the outside and a second end connected with the third air hole 633. That is, the first end of the second hose is detachably connected with the fourth pipe section 621 of the directional control valve 600. When the directional control valve 600 is in the second state, the second air hole 632 is communicated with the third air hole 633. That is, the dirt cup 37 is communicated with the outside. Further, the third air hole 633 of the directional control valve 600 may be communicated with an external pipe to implement dust suction directly through the external pipe without using the brushroll 11. The dirty air and dust from the external pipe sequentially passes through the third air hole 633 of the directional control valve 600, the airflow channel of the directional control valve 600 and the second air hole 632, and then enter the dirt cup 37 for filtration. Finally the clean air obtained is discharged to the outside.

Alternatively, the length of the second hose may be greater than that of the body 31 to prolong the separation time and the transmission time of the dust and dirty air and increase the dust suction capacity, so as to improve the working efficiency of the upright vacuum cleaner 1. Further, the middle part of the second hose may be hanged on the body 31 to make the structure compact. Alternatively, the second hose may be a plastic hose or a rubber hose, so as to facilitate coiling up the first hose 52 to save space and improve the space utilization rate. Therefore, the upright vacuum cleaner 1 has the simple and compact structure and is easy to assemble. The user may choose the suitable dust suction mode according to the specific working condition with simple operations and great user experience.

Figures 18, 19:
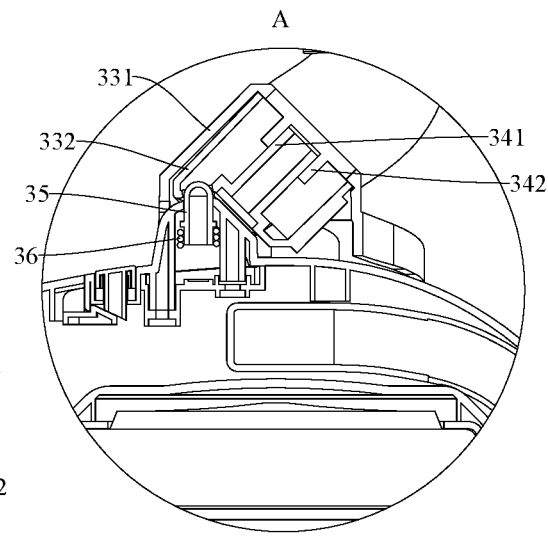
FIG. 18 is a schematic view of a floor brush assembly for an upright vacuum cleaner according to an embodiment of the present disclosure.
FIG. 19 is an enlarged view of part A of FIG. 18.

According to an embodiment of the present disclosure, the body 31 and the bridging member 32 are connected with each other by a connecting pipe assembly 33. Referring to FIG. 18 and FIG. 19, the motor 22 is disposed below the body 31 and the motor housing 21 is connected with the lower end of the body 31. The bridging member 32 is rotatably connected with the motor housing 21, and the top plate 321 of the bridging member 32 is connected with the lower end of the body 31 by the connecting pipe assembly 33.

Alternatively, the connecting pipe assembly 33 includes a first connecting pipe 331 and a second connecting pipe 332. Specifically, the first connecting pipe 331 is disposed on the top plate 321 of the bridging member 32 while the second connecting pipe 332 is disposed on the lower end of the body 31, in which the first connecting pipe 331 is fitted over the second connecting pipe 332.

That is, the connecting pipe assembly 33 mainly includes the first connecting pipe 331 and the second connecting pipe 332, in which the first connecting pipe 331 is connected with the top plate 321 of the bridging member 32; the second connecting pipe 332 is connected with the lower end of the body 31; the second connecting pipe 332 is inserted in the first connecting pipe 331 and is detachably connected with the first connecting pipe 331.

Further, the body 31 and the bridging member 32 are positioned and cooperated with each other by a positioning assembly 34, so as to guarantee mounting the first connecting pipe 331 and the second connecting pipe 332 accurately by positioning. Alternatively, according to an embodiment of the present disclosure, the positioning assembly 34 includes a first positioning piece 341 and a second positioning piece 342. Specifically, the first positioning piece 341 is disposed on the top plate 321 of the bridging member 32, and the second positioning piece 342 is disposed on the lower end of the body 31. One of the first positioning piece 341 and the second positioning piece 342 is a positioning column therein, and the other is a positioning cartridge.

In other words, the positioning assembly 34 mainly includes the first positioning piece 341 and the second positioning piece 342. Referring to FIG. 19, the first positioning piece 341 is disposed within the first connecting pipe 331 and is configured as the positioning column that extends axially along the first connecting pipe 331; the second positioning piece 342 is disposed on the lower end of the body 31 and is configured as the positioning cartridge cooperating with the positioning column; after the first connecting pipe 331 and the second connecting pipe 332 are assembled, the positioning column is inserted in the positioning cartridge. Thus, it is possible to mount the first connecting pipe 331 and the second connecting pipe 332 accurately.

The upright vacuum cleaner 1 further includes a limiting column 35 that is disposed on the motor housing 21 movably in the up-and-down direction. When the body 31 is at in the upright position, the limiting column 35 extends into the bridging member 32 to limit and cooperate with the bridging member 32. When the body 31 moves from the upright position to the oblique position, the limiting column 35 is detached from the bridging member 32.

Referring to FIG. 19, the limiting column 35 is disposed on the top of the motor housing 21 and is movable in the up-and-down direction. When the upright vacuum cleaner 1 is in the working state, i.e. the body 31 at the second oblique position, the limiting column 35 is located outside of the connecting pipe assembly 33, and abuts against with the external wall of the connecting pipe assembly 33 to guarantee the body 31 remaining the oblique state during work, such that the motor 22 may drive the rotation of the brushroll 11 to improve the reliability and continuity of the operation of the upright vacuum cleaner 1. When the upright vacuum cleaner 1 is in the non-working state, i.e. the body 31 at the second upright position, the limiting column 35 is inserted into the connecting pipe assembly 33 to guarantee the body 31 remaining the upright state when the body 31 is unused. Thus, the limiting column 35 disposed on the motor housing 21 may server for limiting positions with a simple, stable and reliable structure which occupies small space.

The upright vacuum cleaner 1 further includes the elastic member 36 that is connected between the limiting column 35 and the motor housing 21 to make the limiting column 35 move up and down. Therefore, the elastic member 36 disposed on the limiting column 35 may serve as a cushion to avoid collision during the rotation of the body 31, so as to guarantee the stability and reliability of the body 31.

As shown in FIG. 19, in this embodiment, the top plate 321 of the bridging member 32 is provided with the first connecting pipe 331 that is internally provided with the positioning column; the lower end of the body 31 is provided with the second connecting pipe 332 that is internally provided with the positioning cartridge. After the second connecting pipe 332 is inserted into the first connecting pipe 331, the positioning cartridge is fitted over the positioning column.

Specifically, the first connecting pipe 331 is connected with the top plate 321 of the bridging member 32 and is internally provided with the first positioning piece 341 that is configured as the positioning column that extends axially along the first connecting pipe 331; the second connecting pipe 332 is connected with the lower end of the body 31 and is internally provided with the second positioning piece 342 that configured as the positioning cartridge cooperating with the positioning column. After the first connecting pipe 331 and the second connecting pipe 332 are assembled, the positioning column is inserted in the positioning cartridge, so as to mount the bridging member 32 and the body 31 accurately and guarantee the reliability of the connection therebetween.

Further, the motor housing 21 is provided with the limiting column 35 movable in the up-and-down direction. When the body 31 is in the upright state, the limiting column 35 passes through a bottom wall of a support sleeve and extends into the support sleeve to limit and cooperate with the support sleeve. When the body 31 moves from the upright state to the oblique state, the limiting column 35 is detached from the support sleeve. Thus, it is convenient to mount the bridging member 32 and the body 31, further to improve the reliability and accuracy of the connection therebetween.

Referring to FIG. 20, the bridging member 32 is provided with a first clearance groove 3211 for avoiding the dirty air output pipe 214 and a second clearance groove 3212 for avoiding the clean air input pipe 215. Specifically, the top plate 321 of the bridging member 32 is provided with the first clearance groove 3211 and the second clearance groove 3212 spaced apart and disposed along the left-and-right direction. When the body 31 is in the upright state, the dirty air output pipe 214 on the motor housing 21 is clamped in the first clearance groove 3211 of the bridging member 32, while the clean air input pipe 215 on the motor housing 21 is clamped in the second clearance groove 3212 of the bridging member 32. When the body 31 moves from the upright state to the oblique state, the bridging member 32 rotates with respect to the motor housing 21, so the dirty air output pipe 214 and the clean air input pipe 215 of the motor housing 21 are detached from the bridging member 32.

Preferably, the first clearance groove 3211 and the second clearance groove 3212 each are configured as semi-circular grooves. Thus, the first clearance groove 3211 and the second clearance groove 3212 cooperate with the respective side walls of the dirty air output pipe 214 and the clean air input pipe 215, to guarantee the compact structure and the aesthetic outlook.

Alternatively, the first clearance groove 3211 and the second clearance groove 3212 are symmetrically disposed along the longitudinal central axis. That is the dirty air output pipe 214 and the clean air input pipe 215 are spaced apart at left and right sides of the central line of the motor housing 21, and symmetrically disposed relative to the central line of the motor housing 21, which creates an aesthetic outlook in accordance with the human visual aesthetics with the reasonable arrangement, and facilitates diverse arrangements of various parts.

The dirt cup 37 may have an air inlet 372 and an air outlet 373; dirty air with dust and debris may enter the dirt cup 37 from the air inlet 372, and the impurities may be intercepted in the dirt cup 37 through filtration of the filter 92; clean air may be exhausted from the air outlet 373 to realize the separation of impurities and air.

The body assembly 300 of the upright vacuum cleaner 1 further includes a cyclonic separating device 900 that includes a filter 92 and a cyclonic cone assembly 93. The filter 92 may be provided in the dirt cup 37. As shown in FIG. 21, the filter 92 includes a filter inlet 92a and a filter outlet 92b communicated between the filter inlet 92a and the air outlet 373. The dirty air in the dirt cup 37 may enter the filter 92 from the filter inlet 92a, and clean air through filtration of the filter 92 may be exhausted from the air outlet 373 via the filter outlet 92b to complete the separation of impurities and air.

Figure 23:
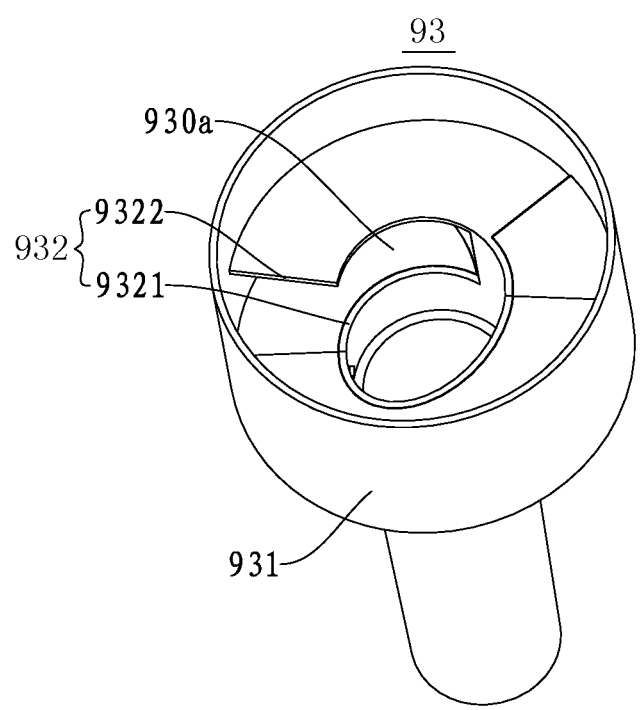
FIG. 23 is a perspective view of a cyclonic cone assembly of a cyclonic separating device according to an embodiment of the present disclosure.

As shown in FIGS. 21 to 23, the cyclonic cone assembly 93 includes a cyclone 931 and a cyclonic guide 932. Specifically, a first end of the cyclone 931 may be communicated with the air inlet 372, and the cyclonic guide 932 may be fitted in a second end of the cyclone 931 and is detachably fitted over the filter 92 to spirally guide the dirty air introduced into the cyclone 931 from the air inlet 372 to the filter inlet 92a.

That is, the dirty air introduced into the cyclone 931 from the air inlet 372 may flow spirally under the guidance of the cyclonic guide 932, and then enters the filter 92 from the filter inlet 92a for filtration; the dust and debris may be intercepted by the filter 92, and clean air may flow out from the filter outlet 92b and flow out from the dirt cup 37 via the air outlet 373 to complete the separation. Since the dirty air spirally flows into the filter 92 from the filter inlet 92a, it is possible to prevent hairs from enwinding the filter 92 to some extent.

Moreover, as the cyclonic guide 932 is detachably fitted over the filter 92, the filter 92 may be cleaned after the cyclonic cleaner 932 is removed from the filter 92, so as to solve the difficulty of cleaning up the filter 92 due to hairs.

In the cyclonic separating device 900 for the upright vacuum cleaner of the present disclosure, the dirty air that enters the cyclone 931 from the air inlet 372 is spirally guided to the filter inlet 92a of the filter 92, and the cyclonic guide 932 of the cyclonic cone assembly 93 is detachably fitted over the filter 92, so it is possible to address the problem of tangled hairs and to facilitate cleaning up.

According to some embodiments of the present disclosure, as shown in FIG. 21 and FIG. 22, the cyclonic guide 932 may include a first cylindrical surface 930, and the filter 92 may include a second cylindrical surface 920, the cyclonic guide 932 being detachably fitted over and cooperating with the filter 92 by the first cylindrical surface 930 and the second cylindrical surface 920. Consequently, the cyclonic guide 932 may stably and closely fitted with the filter 92, which is easy to assemble or disassemble and has high reliability. Additionally, the cyclonic guide 932 and the filter 92 are fitted with each other by the cylindrical surfaces, so as to facilitate cleaning up the tangled hairs.

As an alternative embodiment, as shown in FIG. 21 and FIG. 22, the filter 92 may be configured as a cylinder with an open end (e.g. an upper end shown in FIG. 21) and a closed end (e.g. a lower end shown in FIG. 21); the open end of the filter 92 may define the filter outlet 92b and the filter inlet 92a may be formed in a side wall of the filter 92. Therefore, the dirty air may enter the filter 92 from the filter inlet 92a in the side wall of the filter 92, and clean air after filtration may flow out from the filter outlet 92b at the open end. Thus, the filter 92 is easy to manufacture and has a good filtration effect.

Further, the filter 92 may include a first section 921 and a second section 922. As shown in FIG. 21 and FIG. 22, the first section 921 may be configured to be a solid cylinder while the second section 922 may be configured to be a hollow cylinder; a first end (e.g. a lower end shown in FIG. 1) of the second section 922 is connected with a first end (e.g. an upper end shown in FIG. 1) of the first section 921 and a second end (an upper end shown in FIG. 1) of the second section 922 is open to define the filter outlet 92b that may be formed in the side wall of the second section 922. Accordingly, the filter 92 has a simple and compact structure and is easy to manufacture or process. Moreover, since the first section 921 and the second section 922 are both circular, and are not blocked externally by other parts. If the filter 92 is enwound by hairs, the cyclonic guide 932 may be removed from the filter 92 to clean up the hairs on the filter 92, which is easy to dissemble only with less effort. Also, the filter 92 of this structure may shorten the air flow path effectively to improve the filtration efficiency.

Alternatively, the filter inlet 92a may include a plurality of filter pores 922a that are evenly spaced apart and distributed in an axial direction or a circumferential direction of the second section 922. In other words, the plurality of filter pores 922a may be spaced evenly along the axial direction of the second section 922; or the plurality of filter pores 922a may be spaced evenly along the circumferential direction of the second section 922; or the plurality of filter pores 922a may be spaced evenly along the axial and circumferential directions of the second section 922, as shown in FIG. 21 and FIG. 22. On one hand, large particles (like debris) may be intercepted by the filter pores 922a to realize preliminary separation of the dirty air; on the other hand, the dirty air may enters the filter 92 evenly to reduce the probability of forming a vortex due to the uneven air distribution, so as to improve the filtration efficiency.

In some embodiments of the present disclosure, as shown in FIG. 21 to FIG. 23, the cyclonic guide 932 may include a sleeve 9321 and a guide plate 9322. A part of the sleeve 9321 is fitted over the first section 921 of the solid cylindrical structure to avoid blocking the filter inlet 92a on the second section 922; the guide plate 9322 may be provided between the sleeve 9321 and the cyclone 931 to define, along with the sleeve 9321 and the cyclone 931, a spiral channel 930a for the dirty air to spirally flow in the spiral channel 930a when the dirty air with dust and debris flows from the air inlet 372 to the filter inlet 92a. Thus, the dirty air may flow more smoothly, and the debris and hairs in the dirty air may be hurled out by the centrifugal force during the spiral flow, so as to reduce the probability of enwinding the filter 92 by the hairs.

Alternatively, the sleeve 9321 and the guide plate 9322 are molded integrally. That is, the cyclonic guide 932 may be molded in one piece for the convenience of processing and low cost. In addition, the spiral channel 930a defined in the cyclone 931 has a firm structure and thus lowers the probability of failure and deformation, so as to improve the working reliability of the cyclonic guide 932.

According to some embodiments of the present disclosure, the cyclone 931 and the cyclonic guide 932 may be fixedly connected with each other, i.e. without relative movement between the cyclone 931 and the cyclonic guide 932. Thus, the stability and reliability between the cyclone 931 and the cyclonic guide 932 may be enhanced to reduce the probability of being damaged.

Alternatively, the cyclone 931 and the cyclonic guide 932 may be connected in a screwed manner. For example, the cyclone 931 may be connected on the cyclonic guide 932 by a bolt. Or the cyclone 931 and the cyclonic guide 932 may be connected in a hot-melt manner via ultrasonic waves to further enhance the fastness and reliability of the connection.

In order to improve the separation effect of the cyclonic separating device 900, the cyclonic separating device 900 may include a filter cotton assembly 94. As shown in FIG. 21, the filter cotton assembly 94 may be provided in the dirt cup 37 and located between the filter outlet 92*b* and the air outlet 373. Thus, the air through filtration of the filter 92 may be filtered again by the filter cotton assembly 94 to intercept small-particle impurities to improve the purity of the air exhausted from the air outlet 373.

Alternatively, the dirt cup 37 may be transparent. Since the dirt cup 37 is transparent, the user may observe the filtration in the cyclonic separating device 900 conveniently. If there are too many impurities intercepted in the cyclonic separating device 900, the user may remove the dirt cup 37 to clean the cyclonic separating device 900 to clear the impurities intercepted in the dirt cup 37, and finally mount the cyclonic separating device 900 for use again. If the filter 92 is enwound by hairs, the user may remove the cyclonic guide 932 from the filter 92 to clear up the tangled hairs, and then mount the cyclonic guide 932 and the filter 92 in the dirt cup 37 for further use.

In some embodiments of the present disclosure, the dirt cup 37 may include a dirt-cup body 370, a dirt-cup upper cover 3701 and a dirt-cup lower cover 3702. As shown in FIG. 21, the dirt-cup lower cover 3702 and the dirt-cup upper cover 3701 may be provided at the lower and upper ends of the dirt-cup body 370, in which the air inlet 372 may be formed in the dirt-cup lower cover 3702 while the air outlet 373 may be formed in the dirt-cup upper cover 3701.

Alternatively, as shown in FIG. 21, the air inlet 372 may be formed in a bottom wall of the dirt-cup lower cover 3702, and the air dirt-cup upper cover 3701 may be formed in a side wall of the dirt-cup upper cover 3701 to improve the aesthetics and to facilitate the overall layout of the air channel system of the upright vacuum cleaner.

The working mechanism of the cyclonic separating device 900 for the upright vacuum cleaner according to embodiments of the present disclosure will be descried in detail with reference to FIGS. 21 to 23.

When the upright vacuum cleaner operates, a vacuuming device sucks the dirty air with dust and debris, and the dirty air enters the dirt cup 37 from the air inlet 372 on the dirt-cup lower cover 3702, and enters the cyclone 931 from its lower end to move from down to up in the cyclone 931.

Then, the dirty air enters the cyclonic guide 932 and flows spirally in the spiral channel 930*a* defined by the sleeve 9321, the cyclone 931 and the cyclonic guide 932 together. In such a case, the debris and hairs may be hurled out by the centrifugal force, so as to prevent the hairs form enwinding the filter 92.

The dirty air may enter the filter 92 via the filter pores 922*a* in the side wall of the second section after flowing through the spiral channel 930*a*. The filter pores 922*a* may intercept the debris in the dirty air to implement the preliminary separation of impurities.

Then, the air in the filter 92 may flow to the filter cotton assembly 94 from the filter outlet 92*b*, and the small-particle impurities (like dust) may be intercepted by the filter cotton assembly 94. Thus, further separation may be conducted by the filter cotton assembly 94.

Finally, clean air is exhausted from the air outlet 373 on the dirt-cup upper cover 3701, and the impurities are intercepted in the dirt cup 37. In such a way, separation of impurities and air is completed.

If the filter 92 is enwound by hairs, the user may remove the cyclonic guide 932 from the filter 92 to clear up the tangled hairs, and then mount the cyclonic guide 932 and the filter 92 in the dirt cup 37 for use again.

When the cyclonic separating device 900 is used for a certain time, the user finds that there are too many impurities intercepted in the cyclonic separating device 900, in which case the user may remove the dirt cup 37 to clean the cyclonic separating device 900 to clear the impurities intercepted in the dirt cup 37, and finally mount the cyclonic separating device 900 for use again.

In conclusion, the cyclonic separating device 900 for the upright vacuum cleaner according to embodiments of the present disclosure, the dirty air that enters the cyclone 931 from the air inlet 372 is spirally guided to the filter inlet 92*a* of the filter 92, and the cyclonic guide 932 of the cyclonic cone assembly 93 is detachably fitted over the filter 92, so it is possible to address the problem of tangled hairs and to facilitate cleaning up.

The structure and the working mechanism of the upright vacuum cleaner 1 will be described with reference to the accompanying drawings.

As shown in FIGS. 1 to 23, the upright vacuum cleaner 1 mainly includes the floor brush assembly, the body assembly 300, the clutching device (not shown) and a wheel 38, in which the floor brush assembly includes the brushroll assembly 100 and the motor assembly 200.

Specifically, the brushroll assembly 100 includes the brushroll 11 and the brushroll casing 12 that includes an upper casing 124 and a lower casing 125. The brushroll casing 12 defines the drive-belt mounting chamber 123, and the first air-suction channel 1221 and the second air-suction channel 1222 located at both sides of the drive-belt mounting chamber 123. The brushroll 11 is rotatably provided in the brushroll casing 12, and the drive belt 13 is rotatably provided within the drive-belt mounting chamber 123. Further, an end of the drive belt 13 is winded upon the middle part of the brushroll 11. Referring to FIG. 14 and FIG. 15, the brushroll 11 mainly includes the first brushroll section 111, the second brushroll section 112 and the connecting-shaft section 113 disposed coaxially. The first brushroll section 111, the second brushroll section 112 are connected with both ends of the connecting-shaft section 113. The first brushroll section 111 includes the first body 1111 and the first bristle 1112 provided on the first body 1111; the second brushroll section 112 includes the second body 1121 and the second bristle 1122 provided on the second body 1121. The end of the drive belt 13 is winded upon the connecting-shaft section 113 of the brushroll 11. Further, the brushroll casing 12 is provided with the tensioning wheel 14 to tension the drive belt 13.

The motor assembly 200 includes the motor housing 21, the motor 22 and the fan (not shown). The motor housing 21 defines the motor air-suction channel 216 and the motor air-exhaust channel spaced apart. The motor housing 21 has the dirty air outlet 211 communicated with the motor air-suction channel 216, and the clean air inlet 212 communicated with the motor air-exhaust channel. The motor 22 is provided upright inside the motor housing 21 and is rotatable with respect to the motor housing 21. That is, the motor shaft 221 of the upright vacuum cleaner 1 is arranged along the vertical direction, and the motor 22 is provided in rear of the brushroll 11 and connected with the brushroll 11 via the drive belt 13. Specifically, the first end of the drive belt 13 is winded upon the motor shaft 221 of the motor 22 while the second end of the drive belt 13 is winded upon the brushroll 11. When the motor shaft 221 of the motor 22 rotates, the motor shaft 221 drives the rotation of the drive belt 13, and the drive belt 13 drives the brushroll 11 rotating around its own rotating axis, so as to make the motor 22 drive the rotation of the brushroll 11. Referring to FIG. 10, since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. Further, the motor 22 may drive the rotation of the fan to generate an air flow to provide a vacuuming power; and the motor 22 may drive the rotation of the brushroll 11 around its own axis to realize the purpose of cleaning the floor.

The body assembly 300 includes the body 31, the bridging member 32 and the dirt cup 37, in which the dirt cup 37 and the bridging member 32 are mounted on the body 31 respectively; the bridging member 32 is connected with the lower end of the body 31. Referring to FIG. 18, the bridging member 32 mainly includes two side plates 322 and the top plate 321 provided between the two side plates 322. The two side plates 322 of the bridging member 32 are provided outside the side wall of the motor housing 21 respectively and rotatably connected with the motor housing 21. Meanwhile, the rotatable wheel 38 is provided outside the two side plates 322 of the bridging member 32 to make it easier for the user to push the upright vacuum cleaner 1. The dirt cup 37 defines the separating chamber 371 therein, and includes the air inlet 372 and the air outlet 373 communicated with the separating chamber 371 respectively. The body 31 defines the body air-exhaust channel 311 therein. The dust and debris sucked through the dust suction port of the brushroll casing 12 are delivered into the motor air-suction channel 216 of the motor housing 21 sequentially through the first air-suction channel 1221 and the second air-suction channel 1222, and then into the separating chamber 371 of the dirt cup 37 for filtration. The clean air obtained is discharged to the motor air-exhaust channel of the motor housing 21 from the air outlet 373 of the dirt cup 37, and finally discharged to the outside from the air exhaust hole 213 of the motor housing 21.

The triggering member of the clutching device is rotatably provided on the motor housing 21, and cooperates with the bridging member 32 and the motor casing 222 of the motor 22, such that the bridging member 32 drives the rotation of the clutching device, and the clutching device realizes the rotation of the motor 22.

Referring to FIG. 1, when it is in the non-working state, the upright vacuum cleaner 1 may be placed upright on the floor, i.e. the body 31 being at the second upright position, which occupies small space. If the user needs to use the upright vacuum cleaner 1, the user may hold the handle of the body 31 to push the upright vacuum cleaner 1 during work. First, the user may turn on the switch of the upright vacuum cleaner 1, in which case the drive belt 13 is in the loosening state, and the motor 22 cannot drive the brushroll 11 to rotate. That is, the upright vacuum cleaner 1 is in a stand-by state where the brushroll 11 does not sweep dust. Then, the body 31 is turned manually from the second upright position to the second oblique position, the bridging member 32 on the motor housing 21 rotates clockwise along with the body 31 relative to the motor housing 21, such that the bridging member 32 drives the rotation of the motor 22 in the motor housing 21 by driving the clutching device on the motor housing 21. That is, the motor 22 rotates from the first oblique position to the first upright position. In this process, the lower end of the motor shaft 221 moves backwards gradually, which increases the distance between the lower end of the motor shaft 221 and the brushroll 11, so as to tension the drive belt 13. The motor 22 may drive the rotation of the brushroll 11 by the drive belt 13 to implement the operations of dust sweep and dust suction. Of course, the present disclosure is not limited thereby. The user may rotate the body 31 from the second upright position to the second oblique position directly, in which process the drive belt 13 is tensioned; and then the switch of the upright vacuum cleaner 1 is turned on to implement the operations of dust sweep and dust suction simultaneously.

That is, the user just needs to turn on the switch to start or stop dust sweep by manipulating the direction of the handle of the body 31, with simple operations instead of operation control keys. Alternatively, the switch may be provided on the handle of the body 31 to facilitate manual operations, or may be provided on the brushroll casing 12 or the motor housing 21 below the body 31 to make it convenient to turn on the switch by foot. The motor 22 may be disposed near the floor. That is, the gravity of the motor 22 is lower than that of the motor 22 of the vacuum cleaner in the related art, such that the upright vacuum cleaner 1 having the body 31 of the same length in the present disclosure is easier to operate with less effort.

When the upright vacuum cleaner 1 is in the working state, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21. The air exhaust pipe 39 is provided between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21.

It shall be noted that when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

The other configurations and operations of the upright vacuum cleaner 1 according to embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. A floor brush assembly for an upright vacuum cleaner, comprising:
   a brushroll;
   a motor driving the brushroll to roll via a drive belt that is winded upon a motor shaft of the motor and a central part of the brushroll; and
   a brushroll casing provided outside the brushroll, having a dust suction port and defining a brushroll air-suction channel and a drive-belt mounting chamber for mounting the drive belt, wherein the brushroll air-suction channel and the drive-belt mounting chamber are not air-communicative with each other, the brushroll air-suction channel comprises a first air-suction channel and a second air-suction channel located at both sides of the drive-belt mounting chamber.

2. The floor brush assembly for the upright vacuum cleaner according to claim 1, wherein a rotating axis of the motor is provided in perpendicular to a rotating axis of the brushroll, and the drive belt is provided at a twist angle of 90°.

3. The floor brush assembly for the upright vacuum cleaner according to claim 2, wherein the rotating axis of the motor is disposed vertically; the floor brush assembly further comprises a stopping piece provided below the drive belt and adjacent to the motor to prevent the drive belt from slipping off from the motor shaft; and
   wherein the first air-suction channel and the second air-suction channel are arranged symmetrically with respect to the drive belt.

4. The floor brush assembly for the upright vacuum cleaner according to claim 1, wherein the brushroll comprises a first brushroll section provided with bristles, a second brushroll section provided with bristles, and a connecting-shaft section connected between the first brushroll section and the second brushroll section, the drive belt being winded upon the motor shaft and the connecting-shaft section to make the motor drive the brushroll to roll.

5. The floor brush assembly for the upright vacuum cleaner according to claim 4, wherein the brushroll further comprises:
   a first baffle provided between the connecting-shaft section and the first brushroll section to separate the connecting-shaft section and the first brushroll section; and
   a second baffle provided between the connecting-shaft section and the second brushroll section to separate the connecting-shaft section and the second brushroll section.

6. The floor brush assembly for the upright vacuum cleaner according to claim 4, wherein the first brushroll section comprises a first body and a first bristle provided on the first body; the second brushroll section comprises a second body and a second bristle provided on the second body; there is a plurality of first bristles and each first bristle is spirally winded about the first body in a first direction; there is a plurality of second bristles and each second bristle is spirally winded about the second body in a second direction, the first direction being opposite to the second direction.

7. The floor brush assembly for the upright vacuum cleaner according to claim 4, wherein the first brushroll section and the second brushroll section are provided symmetrically relative to the drive belt; the respective central axes of the first brushroll section, the second brushroll section and the connecting-shaft section are located in the same line.

8. The floor brush assembly for the upright vacuum cleaner according to claim 1, wherein the brushroll casing includes a lower casing and an upper casing connected to a top of the lower casing; the first air-suction channel and the second air-suction channel are defined by the upper casing and/or the lower casing.

9. The floor brush assembly for the upright vacuum cleaner according to claim 1, further comprising:
   a tensioning wheel provided opposite to a part of the drive belt adjacent to the brushroll to tension the drive belt.

10. An upright vacuum cleaner, comprising:
    a floor brush assembly, comprising:
      a brushroll;
      a motor driving the brushroll to roll via a drive belt that is winded upon a motor shaft of the motor and a central part of the brushroll;
      a brushroll casing provided outside the brushroll, having a dust suction port and defining a brushroll air-suction channel and a drive-belt mounting chamber for mounting the drive belt, wherein the brushroll air-suction channel and the drive-belt mounting chamber are not air-communicative with each other, the brushroll air-suction channel comprises a first air-suction channel and a second air-suction channel located at both sides of the drive-belt mounting chamber; and
      a motor housing provided outside the motor, the motor housing having an air exhaust hole, a dirty air outlet and a clean air inlet, and defining a motor air-suction channel and a motor air-exhaust channel, wherein the motor air-suction channel is communicated between the brushroll air-suction channel and the dirty air outlet, the motor air-exhaust channel is communicated between the clean air inlet and the air exhaust hole; and
    a body assembly comprising a body, and a dirt cup mounted on the body and having a separating chamber communicated with the dirty air outlet and the clean air inlet respectively.

11. The upright vacuum cleaner according to claim 10, wherein the dirty air outlet is connected to the dirt cup by an air-inlet pipe assembly so as to be communicated with the separating chamber; the air-inlet pipe assembly comprises an air-inlet pipe provided to the motor housing and having a first end connected to the dirty air outlet, and a first hose connected between a second end of the air-inlet pipe and an air inlet of the dirt cup.

12. The upright vacuum cleaner according to claim 11, wherein the first hose is detachably connected between the second end of the air-inlet pipe and the air inlet of the dirt cup.

13. The upright vacuum cleaner according to claim 10, wherein the body defines a body air-exhaust channel that has a first end connected to an air outlet of the dirt cup and communicated with the separating chamber, and a second end communicated with the clean air inlet.

14. The upright vacuum cleaner according to claim 13, wherein the second end of the body air-exhaust channel is communicated with the clean air inlet by an air exhaust pipe.

15. The upright vacuum cleaner according to claim 10, wherein the motor air-suction channel comprises a first branch channel communicated to the first air-suction channel and a second branch channel communicated to the second air-suction channel; the first branch channel and the second branch channel are converged and communicated with the dirty air outlet.

16. The upright vacuum cleaner according to claim 15, wherein the first branch channel and the second branch channel are defined by a motor casing of the motor and the motor housing together, and constitute a stereoscopic space with a substantially annular cross section.

17. The upright vacuum cleaner according to claim 10, wherein the dirty air outlet and the clean air inlet are arranged axially symmetrically with respect to a central line of the motor housing.

18. The upright vacuum cleaner according to claim 10, further comprising:
a directional control valve having a first air hole, a second air hole and a third air hole, wherein the first air hole is communicated with the brushroll air-suction channel, the second air hole with the air inlet of the dirt cup, the third air hole with the outside, and the directional control valve is configured to switch between a first state where the first air hole and the second air hole are communicated and a second state where the second air hole and the third air hole are communicated.

19. The upright vacuum cleaner according to claim 18, wherein the directional control valve comprises:
a three-way pipe comprising a first pipe section, a second pipe section and a third pipe section communicated with each other, the first air hole defined by a free end of the first pipe section and the second air hole defined by a free end of the second pipe section; and
a two-way pipe comprising a fourth pipe section and a fifth pipe section communicated with each other, the third air hole defined by a free end of the fourth pipe section and a fourth air hole defined by the fifth pipe section, wherein at least a part of the fifth pipe section is inserted into the third pipe section and is movable between a first position where the first air hole is communicated with the second air hole and a second position where the fourth air hole is communicated with the second air hole; a first end of the fifth pipe section is connected with the fourth pipe section and a second end of the fifth pipe section has a closed end wall, and the fourth air hole is formed in a side wall of the second end of the fifth pipe section; an end of the fourth pipe section connected with the fifth pipe section abuts against a free end of the third pipe section when the two-way pipe moves to the second position.

20. The upright vacuum cleaner according to claim 18, further comprising a second hose having a first end communicated with the outside and a second end connected with the third air hole;
wherein the dirt cup comprises the air inlet and the air outlet;
wherein the body assembly further comprises: a filter provided in the dirt cup and having a filter inlet and a filter outlet communicated between the filter inlet and the air outlet; and a cyclonic cone assembly having a cyclone and a cyclonic guide, wherein a first end of the cyclone is communicated with the air inlet, and the cyclonic guide cooperates with a second end of the cyclone and is detachably fitted over the filter to spirally guide dirty air introduced into the cyclone from the air inlet to the filter inlet;
wherein the cyclonic guide comprises a first cylindrical surface and the filter comprises a second cylindrical surface, the cyclonic guide being detachably fitted over and cooperating with the filter by the first cylindrical surface and the second cylindrical surface,
wherein the filter is configured as a cylinder with an open end and a closed end; the open end of the filter defines the filter outlet and the filter inlet is formed in a side wall of the filter,
wherein the filter comprises a first section and a second section; the first section is configured to be a solid cylinder while the second section is configured to be a hollow cylinder; a first end of the second section is connected with a first end of the first section and a second end of the second section is open to define the filter outlet, and the filter inlet is formed in a side wall of the second section;
wherein the filter inlet comprises a plurality of filter pores that are evenly spaced apart and distributed in an axial direction and/or a circumferential direction of the second section;
wherein the cyclonic guide comprises:
a sleeve having a portion fitted over the first section; and
a guide plate provided between the sleeve and the cyclone to define, along with the sleeve and the cyclone, a spiral channel for the dirty air to spirally flow from the air inlet to the filter inlet;
wherein the sleeve and the guide plate are molded integrally; and
wherein the cyclone and the cyclonic guide are connected with thread or in a hot-melt manner via ultrasonic waves.

* * * * *